United States Patent
Merritt et al.

(10) Patent No.: US 6,833,752 B2
(45) Date of Patent: Dec. 21, 2004

(54) HIGH OUTPUT HIGH EFFICIENCY LOW VOLTAGE CHARGE PUMP

(75) Inventors: Todd A. Merritt, Boise, ID (US); Shubneesh Batra, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 292 days.

(21) Appl. No.: 09/797,320

(22) Filed: Mar. 1, 2001

(65) Prior Publication Data

US 2001/0035787 A1 Nov. 1, 2001

Related U.S. Application Data

(63) Continuation-in-part of application No. 09/560,121, filed on Apr. 28, 2000.

(51) Int. Cl.$^7$ .............................. G05F 1/10; G05F 3/02
(52) U.S. Cl. ....................................... 327/536
(58) Field of Search ................... 327/536, 537, 327/589; 365/203, 226

(56) References Cited

U.S. PATENT DOCUMENTS

| | | | |
|---|---|---|---|
| 5,126,590 A | 6/1992 | Chern | 307/296.2 |
| 5,172,013 A | 12/1992 | Matsumura | 307/296.2 |
| 5,537,306 A | 7/1996 | Blodgett | 363/60 |
| 5,642,073 A | 6/1997 | Manning | 327/536 |
| 5,677,645 A * | 10/1997 | Merritt | 327/536 |
| 5,692,164 A | 11/1997 | Pantelakis | 713/501 |
| 5,828,095 A | 10/1998 | Merritt | 257/299 |
| 5,831,470 A * | 11/1998 | Park et al. | 327/536 |
| 5,939,935 A | 8/1999 | Merritt | 327/536 |
| 5,943,226 A * | 8/1999 | Kim | 327/537 |
| 6,023,187 A * | 2/2000 | Camacho et al. | 327/536 |
| 6,055,193 A | 4/2000 | Manning et al. | 365/189.11 |
| 6,075,402 A | 6/2000 | Ghilardelli et al. | 327/536 |
| 6,121,822 A | 9/2000 | Merritt | 327/536 |
| 6,208,197 B1 | 3/2001 | Ternullo, Jr. et al. | 327/536 |
| 6,225,854 B1 | 5/2001 | Cha | 327/536 |
| 6,229,381 B1 | 5/2001 | Keeth | 327/536 |
| 6,285,241 B1 * | 9/2001 | Yoshida | 327/536 |

* cited by examiner

Primary Examiner—Quan Tra
(74) Attorney, Agent, or Firm—Schwegman, Lundberg, Woessner & Kluth, P.A.

(57) ABSTRACT

A high output, high efficiency charge pump is disclosed and claimed. The charge pump includes a charge storage device. A pre-charge circuit is connected to the charge storage device to charge the charge storage device to a charge level to provide a predetermined output voltage from the charge pump. A blocking circuit is provided to prevent charge leakage from the charge storage device to the pre-charge circuit.

46 Claims, 16 Drawing Sheets

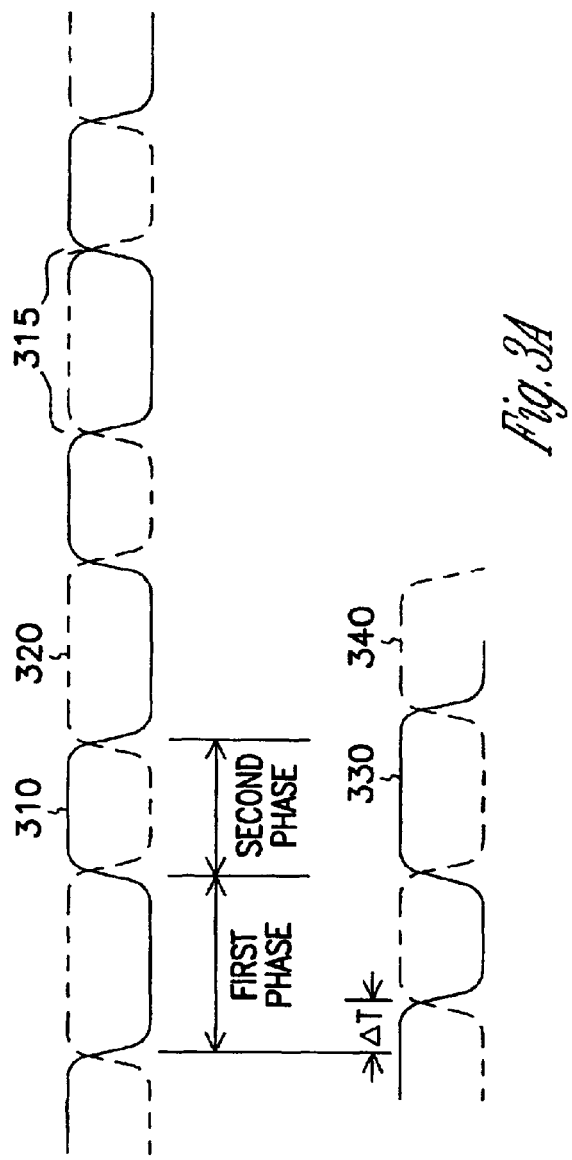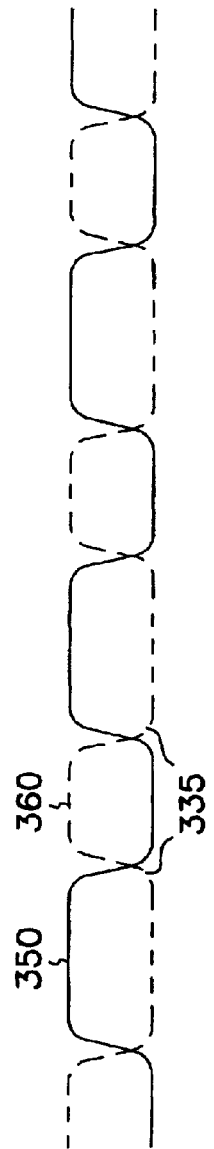

HIGH OUTPUT HIGH EFFICIENCY LOW VOLTAGE CHARGE PUMP

REFERENCE TO RELATED APPLICATIONS

The present invention is a continuation-in-part of to U.S. patent application Ser. No. 09/560,121, filed Apr. 28, 2000 and assigned to the same assignee as the present invention.

FIELD OF THE INVENTION

The present invention relates generally to semiconductor integrated circuits, and more particularly to charge pumps.

BACKGROUND OF THE INVENTION

System designs are routinely constrained by a limited number of readily available power supply voltages ($V_{cc}$). For example, consider a portable computer system powered by a conventional battery having a limited power supply voltage. For proper operation, different components of the system, such as display, processor, and memory components employ diverse technologies which require power to be supplied at various operating voltages. Components often require operating voltages of a greater magnitude than the power supply voltage and, in other cases, a voltage of reverse polarity. The design of a system, therefore, includes power conversion circuitry to efficiently develop the required operating voltages. One such power conversion circuit is known as a charge pump. Charge pumps have been used as on-chip voltage generators capable of providing a voltage more positive than the most positive external supply or more negative than the most negative external supply. The demand for highly efficient and reliable charge pump circuits has increased with the increasing number of applications utilizing battery powered systems, such as notebook computers, portable telephones, security devices, battery-backed data storage devices remote controls, instrumentation, and patient monitors, to name a few.

Inefficiencies in conventional charge pumps lead to reduced system capability and lower system performance in both battery and non-battery operated systems. Inefficiency can adversely affect system capabilities e.g., limited battery life, excess heat generation and high operating costs. Examples of lower system performance include low speed operation, excessive operating delays, loss of data, limited communication range, and inability to operate over wide variations in ambient conditions including ambient light level and temperature.

In addition to constraints on the number of power supply voltages available for system design, there is increasing demand for reducing magnitudes of the power supply voltages due to shrinking die size and also to save power. The demand in diverse application areas requires highly efficient charge pumps that operate from a supply voltage of around one volt.

Thus, there is a need for a low voltage charge pump that can operate at supply voltages less than one volt while reducing the die area and increasing the power efficiency.

SUMMARY OF THE INVENTION

In accordance with the present invention, a charge pump for providing a higher output voltage relative to an input or supply voltage includes a charge storage device or main pump capacitor. A pre-charge circuit is included for pre-charging the charge storage device to a charge level to provide a predetermined output voltage from the charge pump. A blocking circuit is also provided to prevent charge leakage from the charge storage device to the pre-charge circuit.

In a further embodiment of the present invention, a method for making a charge pump includes forming a charge storage device; forming a pre-charge circuit for charging the charge storage device to a charge level to provide a predetermined output voltage from the charge pump; and forming a blocking circuit to prevent charge leakage from the charge storage device to the pre-charge circuit.

BRIEF DESCRIPTION OF THE DRAWINGS

In the drawings, like numerals describe substantially similar components throughout the several views. Like numerals having different letter suffixes represent different instances of substantially similar components.

FIG. 3A is a timing diagram illustrating first and second phase signals associated with the charge pump of the present invention.

FIG. 3B is another timing diagram illustrating first and second phase signals associated with the charge pump of the present invention.

DESCRIPTION OF THE EMBODIMENTS

Figure 1:
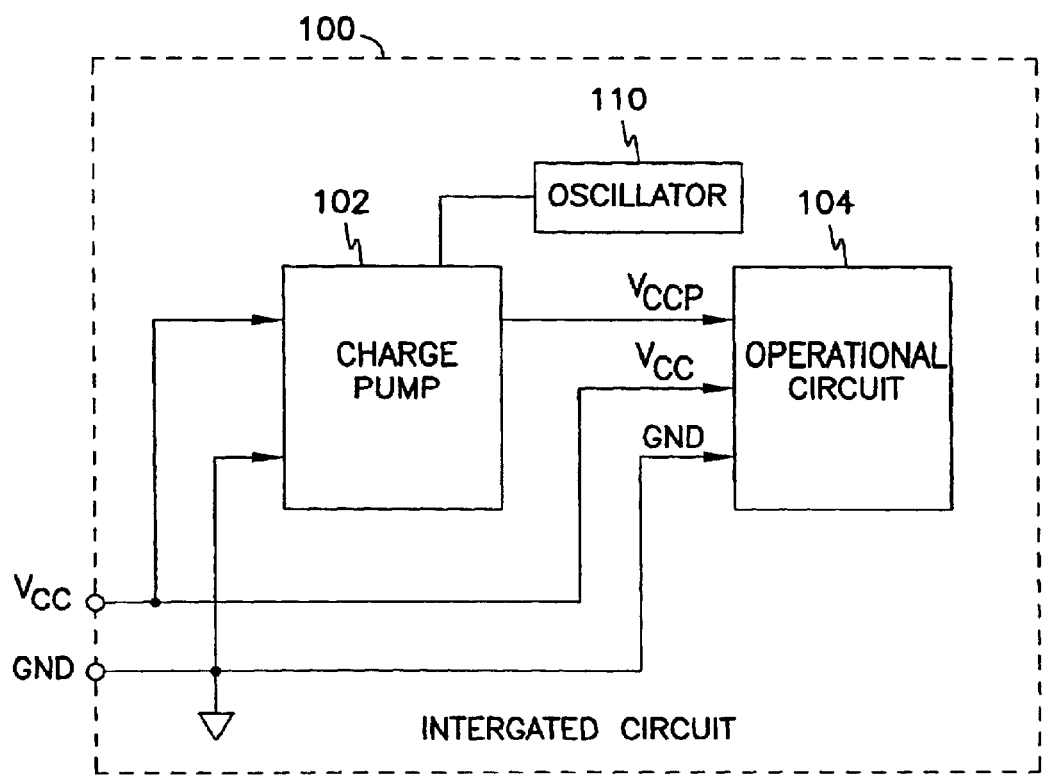
FIG. 1 is a block schematic diagram of a portion of an integrated circuit utilizing a charge pump in accordance with one embodiment of the present invention.

In the following detailed description of the preferred embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that process or mechanical changes may be made without departing from the scope of the present invention. The terms wafer and substrate used in the following description include any base semiconductor structure. Both are to be understood as including silicon-on-sapphire (SOS) technology, silicon-on-insulator (SOI) technology, thin film transistor (TFT) technology, doped and undoped semiconductors, epitaxial layers of a silicon supported by a base semiconductor, as well as other semiconductor support structures well known to one skilled in the art. Furthermore, when reference is made to a wafer or substrate in the following description, previous process steps may have been utilized to form regions/junctions in the base semiconductor structure. The following detailed description is, therefore, not to be taken in a limiting sense, and the scope of the present invention is defined only by the appended claims.

The transistors described herein include transistors from bipolar-junction technology (BJT), field effect technology (FET), or complimentary metal-oxide-semiconductor (CMOS). A metal-oxide-semiconductor (MOS) transistor includes a gate, a first node (drain) and a second node (source). Since a MOS transistor is typically a symmetrical device, the true designation of "source" and "drain" is only possible once voltage is impressed on the terminals. The designations of source and drain herein should be interpreted, therefore, in the broadest sense.

The charge pump circuit here described is a two phase circuit, therefore only one half of the charge pump is producing $V_{ccp}$ at any given time. The "first phase" is herein defined as the time when output an input IN1 to the charge pump is high and the "second phase" is defined as the time when the input IN2 to the charge pump is high.

The terms "crossing around their high points" and "high-high crossing points" refers to the crossing of the first and second signals around their high points of the signals generated by the first and second primary phase generators. Also the phases for the first and second main pump capacitors generally cross high-high for optimum efficiency of the charge pump.

The term "phase generator" means a circuit to generate phase during a phase cycle.

The terms "crossing around their low points" and "low-low crossing points" refers to the crossing of the first and second signals around low points of the signals generated by the first and second primary phase generators. Also the phases for the pre-charge capacitors generally cross low-low for optimum efficiency of the charge pump.

The term "pre-charging capacitors/device" described herein includes any devices capable of providing charges to maintain a predetermined level of charges in an energy-storing device while a system that includes the energy-storing device is turned off. The reason for pre-charging is thus: the energy-storing device may have to store a large amount of charge to enable a charge pump circuit to provide a high-voltage signal. Without pre-charging, an undesired amount of time may have to be taken once the system is turned on to charge the energy-storing device. The pre-charging device described herein can be a square-law device. The pre-charging device described herein can be any transistor fabricated on an integrated circuit using any fabrication technique. The pre-charging device described herein however, may be fabricated as an n-channel transistor with its drain and gate connected together; the drain is connected to an external supply.

The terms "pre-boot capacitors" and "pre-boosting stages" described herein includes any devices capable of providing charges to maintain a predetermined level of charge in an energy storing device while a system that includes the energy-storing device is turned off. Pre-boot capacitors are used first to boot the first and second main pump capacitors to a predetermined boot level. While the first main capacitor is outputting a charge in the first phase, the pre-boot is booting the second main capacitor to a predetermined boot level in the second phase and vice-versa. This process hides the pre-boot time and enables the charge pump circuit to run at a faster cycle time resulting in outputting more charge for a given size of a capacitor.

The term "booting" described herein refers to the principle that the charge on a capacitor cannot change instantaneously. That is, if the voltage on a first side of capacitor is instantaneously increased, the second side of the capacitor will increase by the same amount. The voltage on the second side of the capacitor is therefore "booted" higher.

The term "main energy storing device or charge storage device" means any device capable of storing charge or the main pump capacitor that outputs a desired level of a high-voltage signal during the first or second phase of a phase cycle.

The embodiments of the present invention generate higher voltage at a high efficiency by a charge pump using a low voltage supply.

FIG. 1 is a block diagram of a device illustrating generally one embodiment of the present invention. The device 100 has a charge pump 102, an oscillator 110, and operational circuit 104. The operational circuit 104 can be any functional circuit; for example, a memory device such as a dynamic random access memory (DRAM) or flash memory. The charge pump 102 converts $V_{cc}$ provided by an external power supply into a higher potential $V_{ccp}$. The operational circuit 104, therefore, has both $V_{cc}$ and $V_{ccp}$ available.

Figure 2:
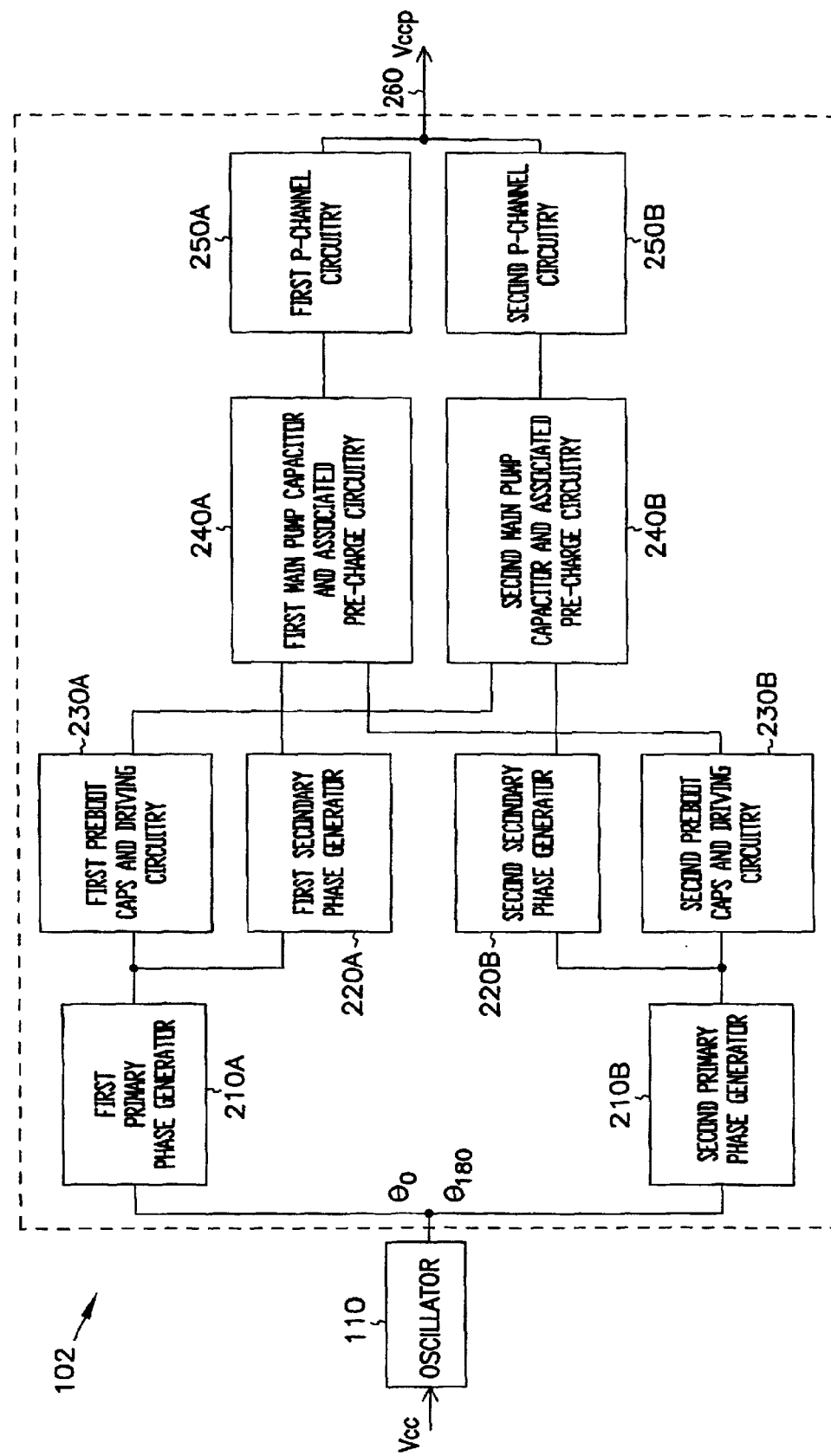
FIG. 2 is a block schematic diagram of a charge pump in accordance with one embodiment of the present invention.

FIG. 2 is a block diagram of a two phase charge pump circuit 102 illustrating generally one embodiment of the present invention. The charge pump circuit 102 includes a plurality of phase generators. The plurality of phase generators further including first and second primary phase generators 210A and 210B which receive an oscillating signal from an oscillator 110, and generates a first and a second phase signal having a high-high crossing point, and a third and a fourth phase signal having a low-low signal crossing point.

In one embodiment, at node 252, a capacitor may be placed upon the node 252 to ground for noise filtering. However, in other embodiments, linear, non-linear, or a combination of linear and non-linear elements may be placed upon the node 252 to function as an output load.

The charge pump circuit 102 further includes a first and a second secondary phase generator 220A and 220B, which receive the first and second phase signals having the high-high crossing point and generates delayed fifth and sixth phase signals similar to the first and second phase signals, having a high-high crossing point respectively. The charge pump circuit 102 further includes first and second pre-boot or pre-charge capacitors and associated driving circuitry 230A and 230B, which receive the first and second phase signals having high-high crossing points, and third and fourth phase signals having low-low crossing points. The charge pump circuit 102 further includes a first and a second main pump capacitor and associated pre-charge circuitry 240A and 240B, which receive the delayed fifth and sixth phase signals having the high-high crossing points from the first and second secondary phase generators 220A and 220B respectively. In a typical charge cycle, during the first phase, the first main pump capacitor 240A receives the fifth delayed phase signal having high-high crossing point from the first secondary phase generator 220A and outputs a charge to a first p-channel circuit 250A, while the second main pump capacitor 240B is getting pre-booted or pre-charged to a predetermined boot or charge level by the second pre-boot capacitor 230B. In the same charge cycle, during the second phase the pre-booted second main pump capacitor 240B receives the delayed sixth phase signal from the second secondary phase generator 220B and outputs the charge to a second p-channel circuitry 250B, while the first main pump capacitor 240A is getting pre-booted to the predetermined boot level by the first pre-boot circuit 230A. This process repeats itself every charge cycle and generally hides the pre-boot time required to pre-boot the first and second main capacitors 240A and 240B. As a result of staggered phase generators, the pre-boot circuitry 230A and B, and p-channel output circuitry 250A and B, the charge pump circuitry 102 can operate at supply voltages less than 1.0 Volts, and run at a faster cycle time, resulting in outputting more charge for a given size of a capacitor.

FIG. 3A is a timing diagram illustrating generally by way of example but not by way of limitation one embodiment of portions of first and second phase signals 310 and 320 generated by first and second primary phase generators 210A and 210B respectively, that are non-overlapping and crossing around high points 315 during every phase cycle. Also, shown are the fifth and sixth phase signals 330 and 340 generated by the first and second secondary phase generators 220A and 220B respectively, that is similar to the first and second phase signals, and including a pre-determined delay 'Δt' from the first and second phase signals respectively.

FIG. 3B is a timing diagram illustrating generally by way of example but not by way of limitation portions of third and fourth phase signals 350 and 360 generated by the first and second primary phase generators 210A and 210B respectively, that are non-overlapping and crossing around low points 335 during every phase cycle.

Figure 4:
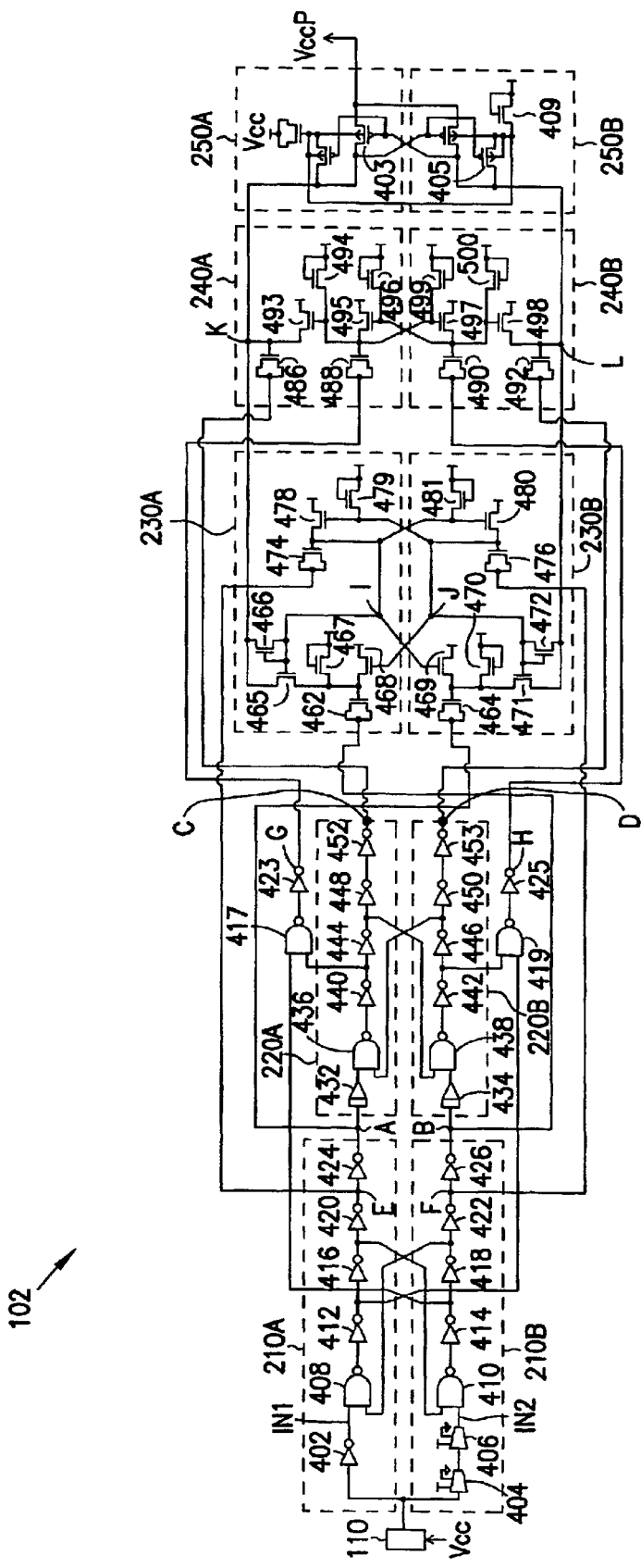
FIG. 4 is a schematic diagram of a charge pump circuit in accordance with one embodiment of the present invention.

FIG. 4 is a schematic diagram illustrating generally by way of example but not by way of limitation one embodiment of a charge pump circuit 102. In this embodiment, the charge pump circuit 102 includes first and second primary phase generators 210A and 210B, first and second secondary phase generators 220A and 220B, first and second pre-boot or pre-charge capacitors and associated pre-charge circuits 230A and 230B, first and second main pump capacitors and associated pre-charge circuits 240A and 240B, and a first and a second p-channel output gates and associated circuitry 250A and 250B. The charge pump 102 is designed symmetrically such that during a first phase the charge pump 102 provides a pump voltage $V_{cc}$ using one-half of the charge pump circuit and during the second phase $V_{ccp}$ is provided using the other-half of the charge pump circuit. The operation of the charge pump 102 is described in detail below following a description of the charge pump circuit 102.

The first and second primary phase generators 210A and 210B receive an oscillating signal produced by oscillator 110 located in the integrated circuit 100 (FIG. 1). Inverter 402 and multiplexers 404 and 406 provide signals IN1 and IN2 which are 180 degrees out of phase with a crossing point very near $V_{cc}/2$. IN1 and IN2 are the inputs to the cross-coupled NAND gates 408 and 410. The cross-coupled NAND gates and subsequent invertors 412, 416, 420, 414, 418 and 422 provide third and fourth signals that are non-overlapping and crossing around low points of their signals during the first and second phases at node point E and F respectively. Subsequently inverters 424 and 426 provide first and second phase signals that are non-overlapping and crossing around high points of their signals during the first and second phases at nodes A and B respectively. The first and second phase signals coming from nodes A and B drive the first and second secondary phase generators 220A and 220B. The first and second secondary phase generators 220A and 220B generate fifth and sixth phase signals at nodes C and D, which are delayed from the first and second phase signals. Driving the first and second secondary phase generators 220A and 220B with an output of the first and second primary phase generators 210A and 210B provides an inherent delay though NAND gates 436 and 438, and further driving through invertors 440, 444, 448, 452, 442, 446, 450, and 453 of the first and second secondary phase generators 220A and 220B. In one embodiment delays 432 and 434 can be added to provide additional delay to output the first and sixth phase signals for supply voltages operating above 1.5 volts. Delays 432 and 434 can be removed for supply voltages operating below 1.5 Volts. The fifth and sixth phase signals are similar to first and second phase signals, and only they have a predetermined delay from the first and second phase signals. This delay sets the amount of time necessary for pre-booting the first and second main capacitors 240A and 240B.

The first and second phase signals coming from nodes A and B also drive the first and second pre-boot or pre-charge capacitors 462 and 464 respectively. Whereas the third and fourth phase signals coming from nodes E and F drive the first and second pre-boot, pre-charge capacitors 474 and 476 respectively. First and second pre-boot, pre-charge capacitors 474 and 476 are responsible for recharging the first and second pre-boot capacitors 462 and 464. The first and second pre-boot, pre-charge capacitors 474 and 476 are tied in a cross-coupled manner, such that they pre-charge each other through n-channel gates 478 and 480. The reason for third and fourth phase signals to be non-overlapping and crossing each other around their low points is that the gate of the first pre-boot, pre-charge capacitor 474 should close low before the gate of second pre-boot, pre-charge capacitor 476 goes high, otherwise the boost voltage of the second pre-boot, pre-charge capacitor 476 would leak off through the pre-charge transistor 480. The gate nodes of these first and second pre-boot, pre-charge capacitors 474 and 476 also drive the pre-charge transistors 468 and 469 of the pre-boot capacitors 462 and 464 respectively. Also the gate nodes of the first and second pre-boot, pre-charge capacitors drive charge sharing transistors 465 and 471 which provide the path that charge shares the first and second pre-boot capacitors 462 and 464, to a first and second main pump capacitors 486 and 492 of a first and second main pump capacitor and associated pre-charge circuitry 240A and 240B to a pre-determined boot level. Diode transistors 467, 468, 469, 470, 479, and 481 are there for power-up. They charge-up first and second pre-boot capacitors 462 and 464, and first and second pre-boot, pre-charge capacitors 474 and 476 at power-up, so that they can start pumping. Diode transistors 472 and 466 clamp gates of the first and second pre-boot, pre-charge capacitors 474 and 476 to a threshold voltage above the gates of the first and second main pump capacitors 486 and 492 respectively. This helps to limit over-voltage and puts the excess charge onto the main pump capacitors where it can be passed to $V_{ccp}$.

The first and second phase signals coming from nodes A and B also drive the second and first pre-boot capacitors 464 and 462 respectively. Whereas the third and fourth phase signals coming from nodes E and F drive the first and second pre-boot pre-charge capacitors 474 and 476 respectively. First and second pre-boot pre-charge capacitors 474 and 476 are responsible for recharging the first and second pre-boot capacitors 462 and 464. The first an second pre-boot pre-charge capacitors 474 and 476 are tied in a cross-coupled manner, such that they pre-charge each other through n-channel gates 478 and 480. The reason for third an fourth phase signals to be non-overlapping and crossing each other around their low points is that the gate of the first pre-boot pre-charge capacitor 474 should close low before the gate of second pre-boot pre-charge capacitor 476 goes high, otherwise the boost voltage of the second pre-boot pre-charge capacitor 476 would leak off through the pre-charge transistor 480. The gate nodes of these second and first pre-boot pre-charge capacitors 476 and 474 also drive the pre-charge transistors 468 and 469 of the pre-boot capacitors 462 and 464 respectively. Als the gate nodes of the first and second pre-boot pre-charge capacitors drive charge sharing transistors 465 and 471 which provide the path that charge shares the first and second pre-boot capacitors 462 and 464, to a first and second main pump capacitors 486 and 492 of a first and second main pump capacitor and associated pre-charge circuitry 240A and 240B to a pre-determined boot level. Diode transistors 467, 470, 479, and 481 are there for power-up. They charge-up first and second pre-boot capacitors 462 and 464, and first and second pre-boot pre-charge capacitors 474 and 476 at power-up, so that they can start pumping. Diode transistors 466 and 472 clamp gates of the first and second pre-boot pre-charge capacitors 474 and 476 to a threshold voltage above the gates of the first and second main pump capacitors 486 and 492 respectively, This helps to limit over-voltage and puts the excess charge onto the main pump capacitors where it can be passed to $V_{ccp}$.

The diode transistors 494, 496, 499, and 500 of the first and second main pump capacitor and associated circuitry 240A and 240B are for power-up. These diode transistors 494, 496, 499, and 500 provide a starting voltage to the first and second main pump pre-charge capacitors 488 and 490. Transistor 497 pre-charges the second main pump pre-charge capacitor 490, and transistor 495 pre-charges the first main pump pre-charge capacitor 488. The first and second main pump pre-charge capacitors 488 and 490 are used to pre-charge the first an second main pump capacitors 486 and 492 to a second pre-determined level through pre-charge devices 493 and 498. The seventh phase signal at node G is generated by the output of inverter 414 of the second primary phase generator 210B and the output of inverter 440 of the first secondary phase generator 220A being inputted into a NAND gate 417 and then inverting the output of the NAND gate 417 with inverter 423. Similarly, the eighth phase signal at node H is generated by passing the output of inverter 412 of the first primary phase generator 210A and the output of inverter 442 of the second secondary phase generator 220B through NAND gate 419 and inverting the output of NAND gate 419 through inverter 452. The seventh and eighth phase signals from nodes G and H are small because these signals should not be recharging the first and second main pump capacitors 486 and 492 while they are being pre-booted by the first and second pre-boot capacitors 462 and 464, otherwise the pre-boot charges will be shunted to $V_{cc}$.

In one embodiment the charge pump circuitry 102 is enabled to pre-boot or pre-charge one main pump capacitor while the other main pump capacitor is outputting the charge. The alternating pre-booting or pre-charging of one main pump capacitor while the other outputs charge, hides or masks the pre-boot time, which results in the charge pump operating at a faster cycle time and hence a higher output charge. This embodiment of the charge pump circuitry 102 also includes staggered phase generators that operate without a delay element at voltages lower than 1.5 Volts. The pre-boot capacitors 486 and 492 provide additional voltage capacity at supply voltages of less than 1.5 Volts and the p-channel circuitry 250A and 250B provide additional operating voltage capacity of about 800 millivolts which enables the charge pump circuitry 102 to operate efficiently at supply voltages around 1.0 Volts.

Figure 5:
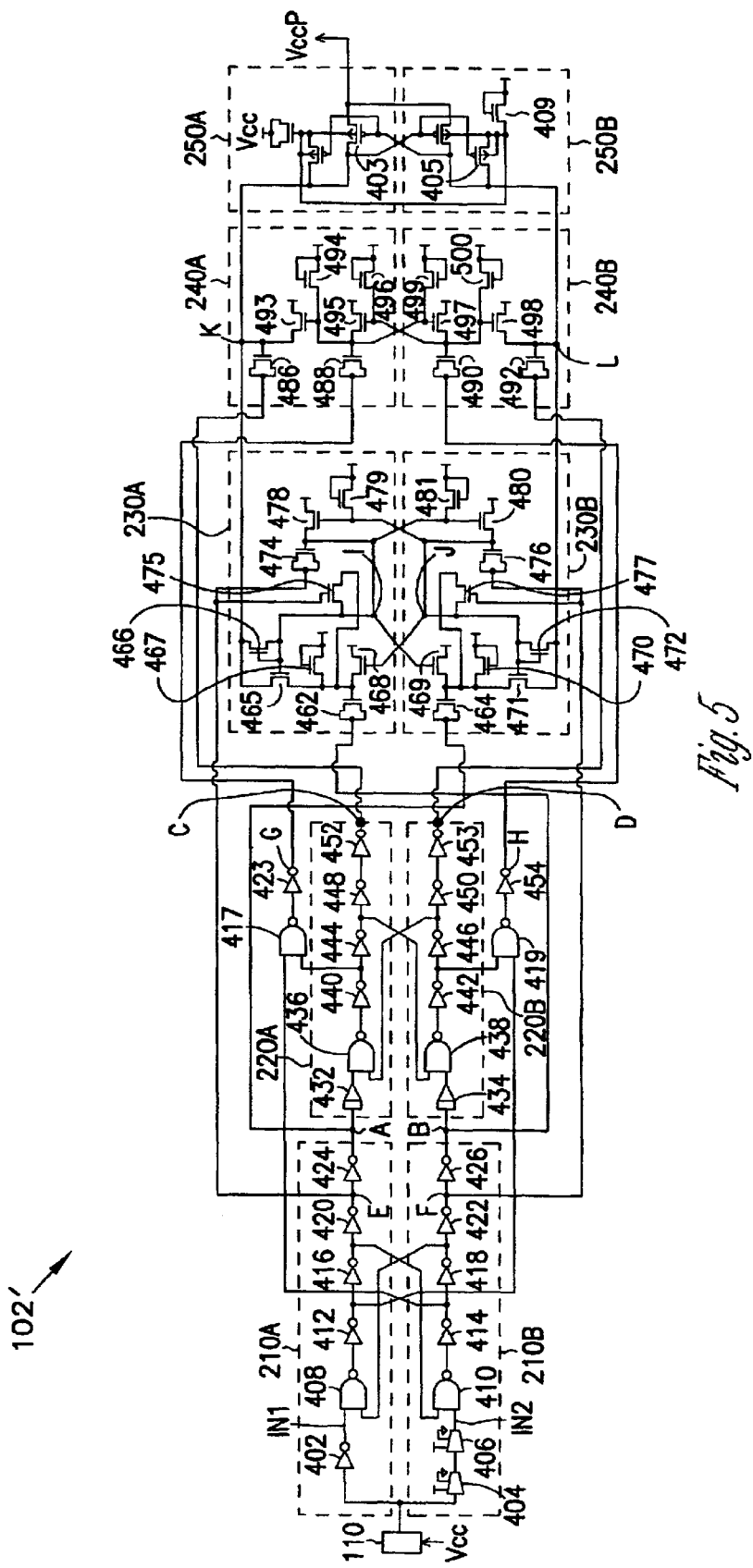
FIG. 5 is a schematic diagram of a charge pump circuit in accordance with another embodiment of the present invention.

Another embodiment of the charge pump 102' is shown in FIG. 5. In this embodiment, a blocking circuit or pass transistors 475 and 477 are provided in the first and second pre-boot capacitor circuits 230A and 230B, respectively to prevent charge from the first and second main pump capacitors 486 and 492 from leaking back to the first and second pre-boot or pre-charge capacitors 462 and 464 during the time one or the other of main pump capacitors 486 and 492 are alternately switched to output charge. The gate of the pass transistor 475 is connected to the input of the pre-boot, pre-charge capacitor 474 and to the first primary phase generator 210A to receive the third phase signal. One terminal of the pass transistor 475 is connected to the gate of drive charge sharing transistor 465 and the other terminal of the pass transistor 475 is connected to the gate of the first pre-boot capacitor 462 and through transistor 465 to a gate of the first main pump transistor 486. Similarly, the gate of the pass transistor 477 is connected to the input of the pre-boot, pre-charge capacitor 476 and to the second primary phase generator 210B to receive the fourth phase signal. One terminal of the pass transistor 477 is connected to the gate of the drive charge sharing transistor 471 and the other terminal of the pass transistor 477 is connected to a gate of the of the second pre-boot capacitor 464 and is connected to the gate of the second main pump capacitor 492 via transistor 471. The pass transistors 475 and 477 will alternate being active in response to a third or fourth phase signal being present to turn on the transistors 475 and 477 to prevent charge from the main pump capacitors 486 and 492 from leaking back through nodes K and L to the first and second pre-boot capacitors 462 and 464, respectively, during the time the main pump capacitors 486 and 492 are being switched alternately between pre-charging phases and output phases when outputting charge to the output devices 250A and 250B. The pass transistors 475 and 477 effectively prevent the first and second pre-boot capacitors 462 and 464 from drawing charge from the first and second main pump capacitors 486 and 492, respectively, when the first or second main pump capacitor 486 or 492 is switched to output charge to the associated output circuit 250A or 250B.

Figure 6:
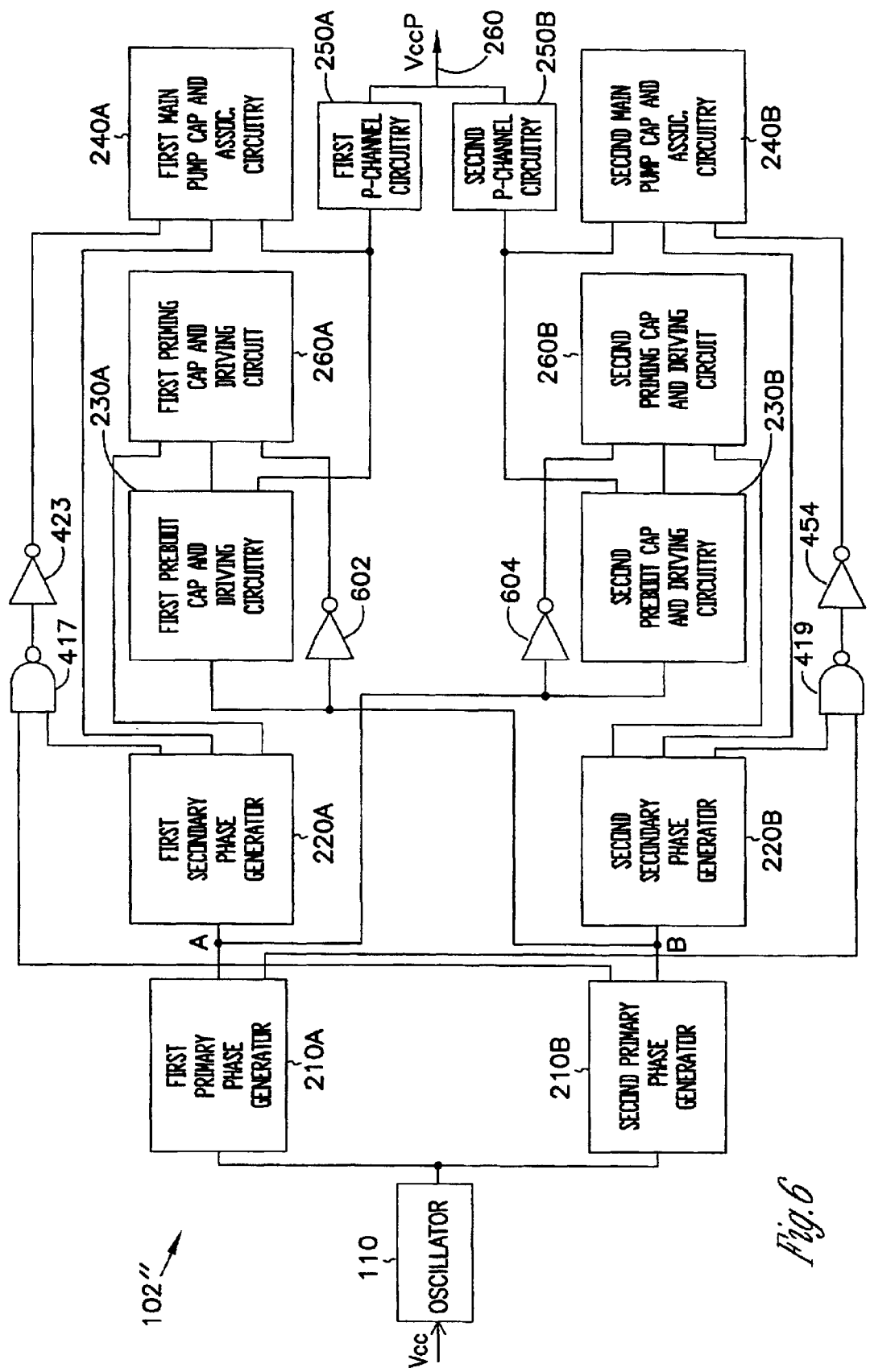
FIG. 6 is a block schematic diagram of a charge pump in accordance with a further embodiment of the present invention.
Figure 7A:
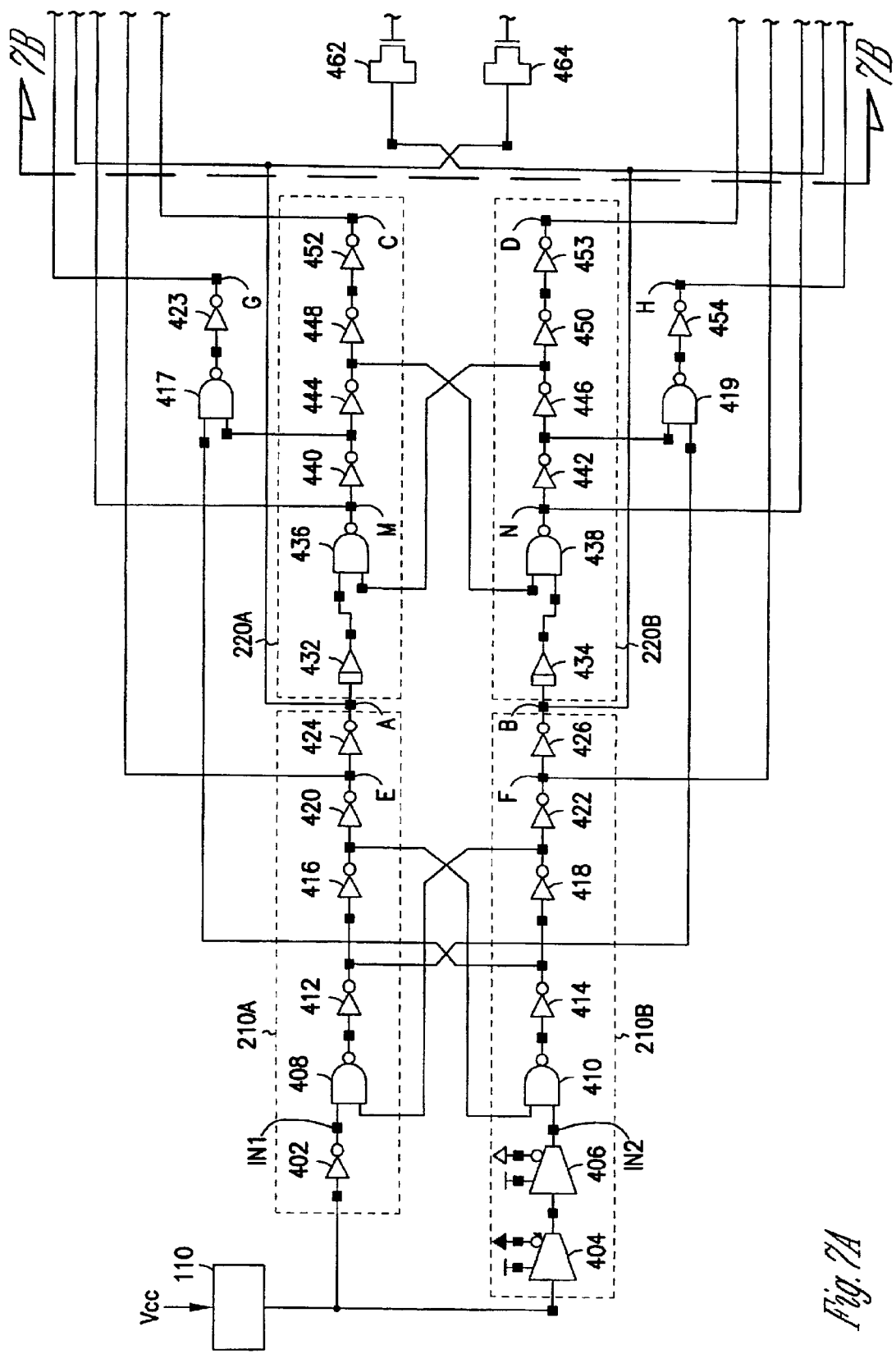
FIGS. 7A and 7B are a schematic diagram of a charge pump circuit in accordance with an embodiment of the present invention.
Figure 7B:
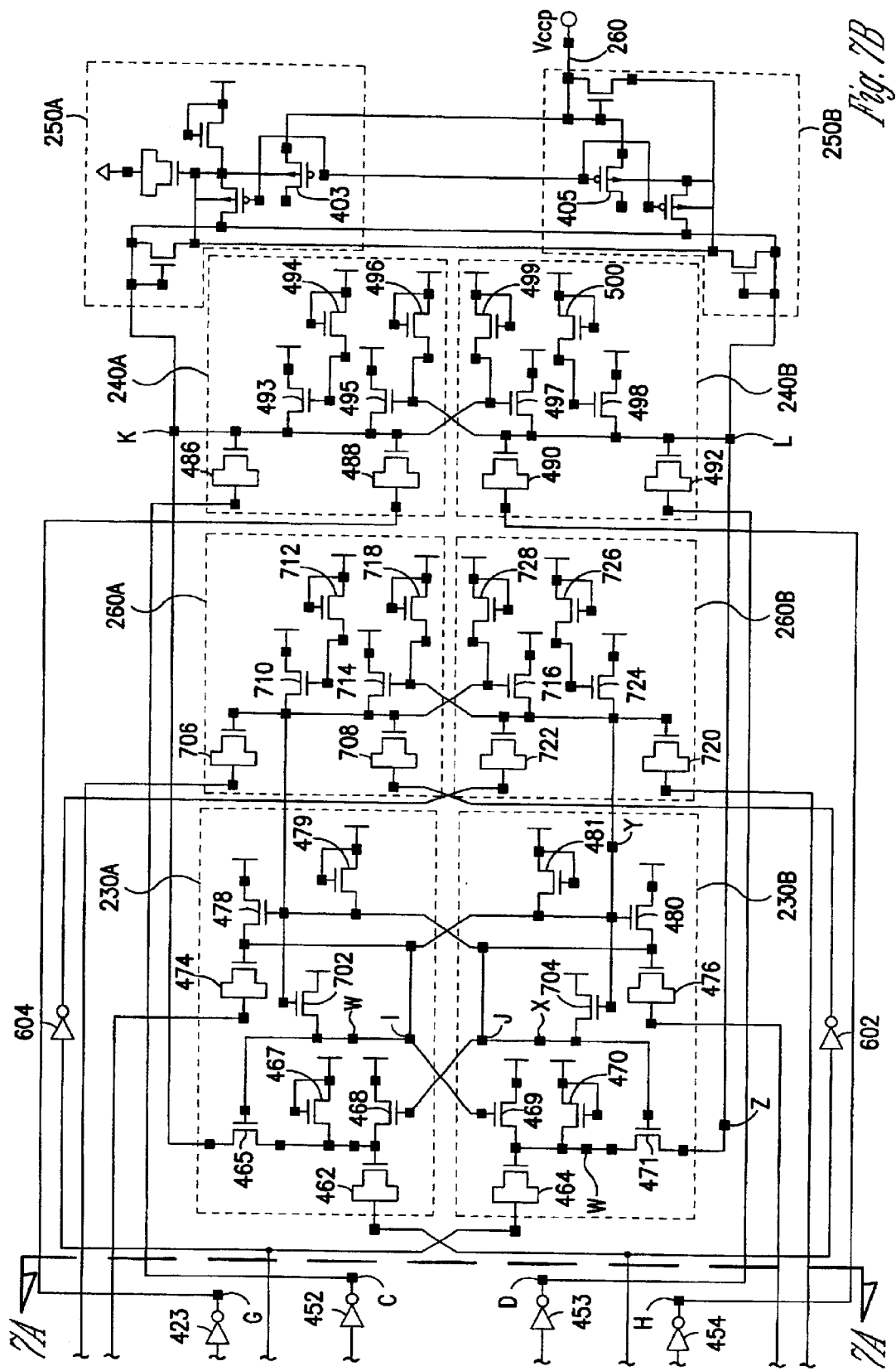

A further embodiment of the charge pump 102" of the present invention is shown in block diagram form in FIG. 6 and in detail in FIGS. 7A and 7B. The charge pump 102" is similar to the charge pump 102 of FIG. 4 except that a first priming capacitor and driving circuit 260A in combination with the pass transistor 702 (FIG. 7B) and a second priming capacitor and driving circuit 260B in combination with the pass transistor 704 form respective blocking circuits to prevent charge from leaking from the main pump capacitors 486 and 492 to the pre-boot capacitors 462 and 464, respectively, when the main pump capacitors 486 and 492 are switched to output charge. The first and second priming capacitor and driving circuits 260A and 260B respectively control the operation of the pass transistors 702 and 704 to switch the pass transistors 702 and 704 on and off to prevent charge leakage as will be described below.

The first priming capacitor and driving circuit 260A is coupled via an inverter 602 to a node B at the output of the second primary phase generator 210B, and is coupled to the first pre-boot capacitor and driving circuit 230A and to the first secondary phase generator 220A. The second priming capacitor and driving circuit 260B is coupled via an inverter 604 to a node A at the output to the first primary phase generator 210A, to the second pre-boot capacitor and driving circuit 230B and to the second secondary phase generator 220B.

Referring also to FIGS. 7A and 7B, the first priming capacitor and driving circuit 260A includes a primary priming capacitor 706 and a secondary priming capacitor 708. The primary priming capacitor 706 is coupled by one terminal to node M at the output of NAND gate 436 in the first secondary phase generator 220A and the secondary priming capacitor 708 is coupled via the inverter 602 to node B at the output of the second primary phase generator 210B. The other terminal or gate of the primary priming capacitor 706 is coupled to the gate of the pass transistor 702 in the first pre-boot capacitor and driving circuit 230A to control operation of the pass transistor 702. The gate of the primary priming capacitor 706 is also coupled to one terminal of a transistor diode 709. The other terminal of the transistor diode 709 is connected to a voltage supply for charging the primary priming capacitor 706. The gate of the transistor diode 709 is connected to another transistor diode 712 that is also coupled to the supply voltage.

The secondary priming capacitor 708 has a gate connected to one terminal of a diode transistor 714 and is cross-coupled to a gate of another diode transistor 716 in the second priming capacitor and driving circuit 260B. The gate of the diode transistor 714 is coupled to the voltage supply by another diode transistor 718 and the second terminal of the diode transistor 714 is connected to supply voltage for charging the secondary priming capacitor 708.

The second priming capacitor and driving circuit 260B has a similar structure to the first priming capacitor and driving structure 260A. The second priming capacitor and driving circuit 260B includes a primary priming capacitor 720 and a secondary priming capacitor 722. The primary priming capacitor 720 is coupled by one terminal to a node N at the output of the NAND gate 438 in the second secondary phase generator 220B and the other terminal or gate terminal of the primary priming capacitor 720 is coupled to a gate of the pass transistor 704 in the second pre-boot capacitor and driving circuit 230B to control operation of the pass transistor as will be described in more detail below. The gate terminal of the primary priming capacitor 720 is also connected to one terminal of a diode transistor 724. The other terminal of diode transistor 724 is connected to the supply voltage and the gate of the diode transistor 724 is connected to the gate of the secondary priming capacitor 722 and to one terminal of another diode transistor 726 which is connected by the second terminal to the supply voltage.

The secondary priming capacitor 722 of the second priming capacitor and driving circuit 260B is coupled by one terminal to the output of the inverter 604 and the input of the inverter 604 is coupled to node A at the output of the first primary phase generator 210A. The other terminal or gate terminal of the secondary priming capacitor 722 is connected to one terminal the diode transistor 716 and is also cross-coupled to the gate of the diode transistor 714 and one terminal of the diode transistor 718, both in the first priming capacitor and driving circuit 260A. The gate terminal of the diode transistor 716 is coupled to another diode transistor 728 and the second terminal of the diode transistor 716 is coupled to the supply voltage for charging the secondary priming capacitor 722.

Figure 8:
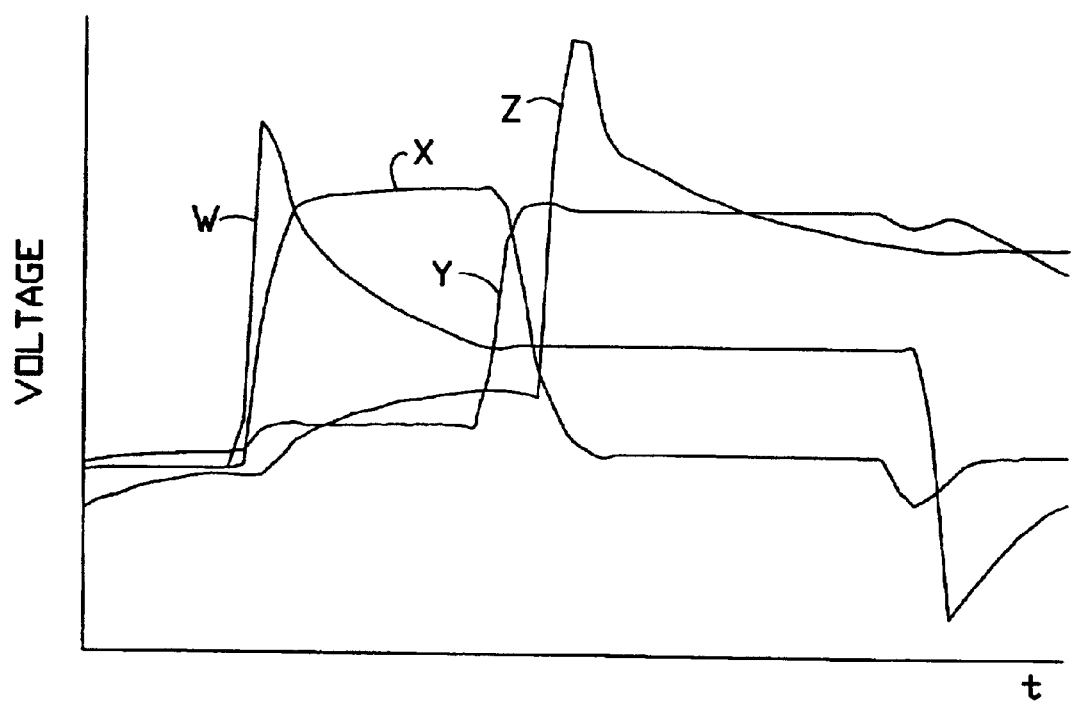
FIG. 8 is a graph of voltage versus time for different nodes in the charge pump circuit of FIGS. 7A and 7B.

The operation of the blocking circuit formed by the second priming capacitor and driving circuit 260B and the pass transistor 704 will now be explained with reference to FIG. 8. FIG. 8 shows the voltages at nodes W, X, Y and Z in FIG. 7B over a time period or half cycle. Initially, the voltage at node W goes high because of the second pre-boot capacitor 464 and the second main pump capacitor 492 will be pre-charged by the second pre-boot capacitor 464 through node Z and the diode transistor 471 in response to node Y going high to turn on the diode transistor 471. After a time delay, node Y is driven high by the primary priming capacitor 720 of the second priming capacitor and driving circuit 260B to activate or turn on the pass transistor 704 to connect node X to the supply voltage. The supply voltage effectively pulls down the voltage at node X to shut off the diode transistor 471 to isolate node Z from node W and thereby prevent leakage of charge back from the second main pump capacitor 492 to the second pre-boot capacitor 464 when the second main pump capacitor 492 is switched to output charge to the gate device 250B.

The blocking circuit formed by the first priming capacitor and driving circuit 260A and the pass transistor 702 will operate in the same manner during alternate half cycles when the charge pump 102 switches to output charge from the first main pump capacitor 486 rather than the second main pump capacitor 492.

Figure 9:
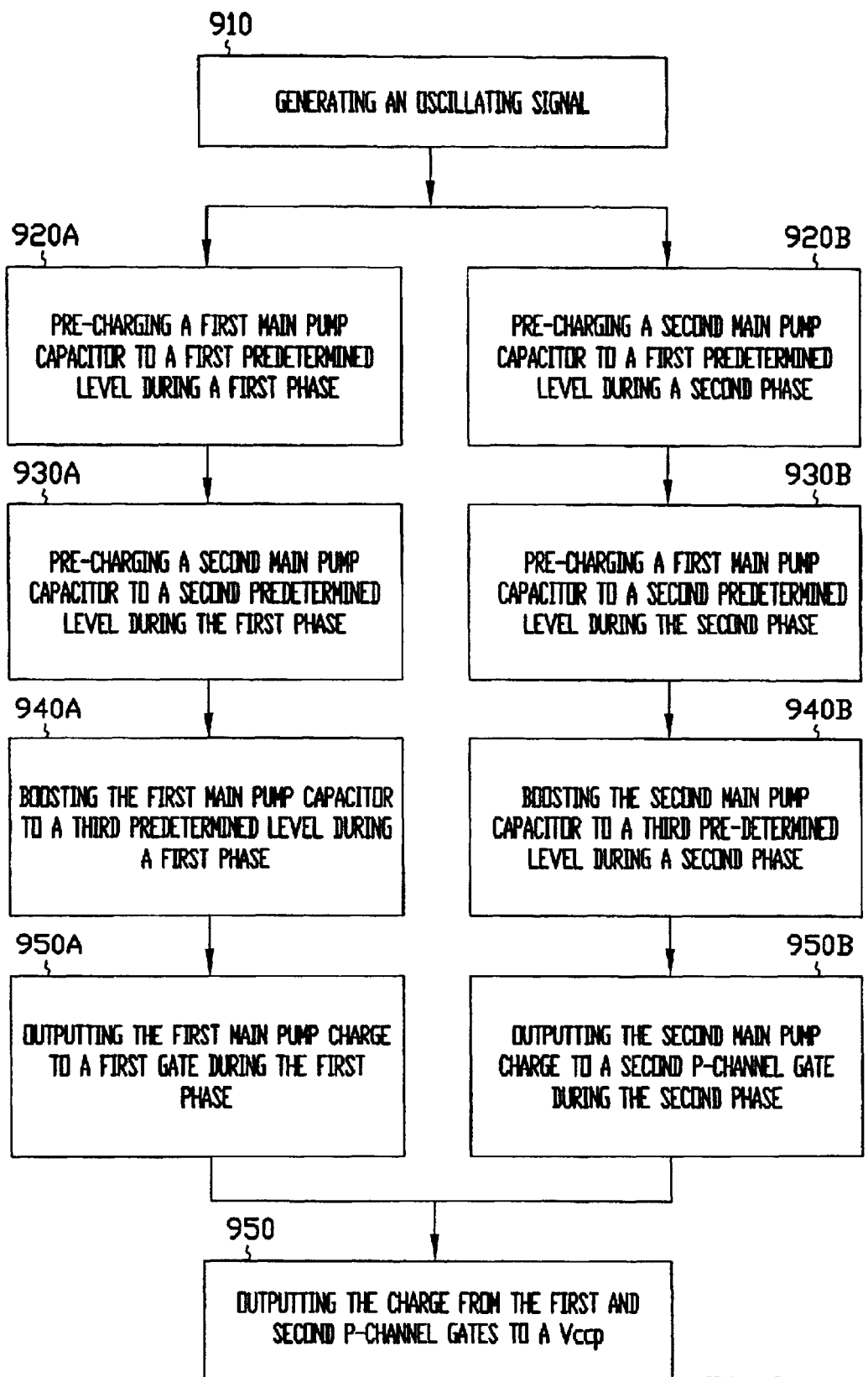
FIG. 9 is a flow chart illustrating a method of operation of the charge pump circuit of the present invention.

FIG. 9 is a flow diagram illustrating the operation of a charge pump circuit 102 in accordance with one embodiment of the present invention. The first step in the method of operating the charge pump is to generate an oscillating signal 510. In one embodiment the oscillating signal is input to a primary phase generator for generating first and second phase signals that are non-overlapping and crossing each other around their highest points during a phase cycle of the oscillating signal 510. Then the primary phase generator further generates third and fourth phase signals that are non-overlapping and crossing each other around their lowest points during each phase cycle of the oscillating signals 510. A secondary phase generator receives the first and second phase signals from the primary phase generator and generates a fifth and sixth phase signals similar to the first and second phase signals and having a pre-determined delay from the first and second phase signals. Intermediate signals from the primary phase generator and the secondary phase generator are combined to create seventh and eighth phase signals. Then a first pre-boot capacitor and associated driving circuitry receives the second and third phase signals from the primary phase generator during the first phase, and pre-boots or pre-charges a first main pump capacitor to a first predetermined level during the first phase at step 520A. A second pre-boot capacitor and associated driving circuitry receives the first and fourth phase signals from primary phase generator during the second phase, and pre-boots or pre-charges a second main pump to a first predetermined level during the second phase in step 520B. A first main pump pre-charge capacitor receives the seventh phase signal from the primary phase generator, and the first main pump capacitor is further pre-charged by the first main pump pre-charge capacitor during the second phase to a second predetermined level at step 530B. A second main pump pre-charge capacitor receives the eighth phase signal from the primary phase generator, and the second main pump is further pre-charged by the second main pump pre-charge capacitor during the first phase to a second predetermined level 530A. Then in one embodiment the fifth phase signal from the secondary phase generator is input to raise the first main pump capacitor to a third predetermined level in step 540A and a charge is output from the first main pump during the first phase in step 550A. Then in this embodiment the sixth phase signal from the secondary phase generator is input to raise the second main pump to a third predetermined level in step 540B and a charge is output from the second main pump during the second phase in step 550B. The charge from the first main pump passes through the first pass gate (first p-channel circuitry 250A) to provide a pump voltage $V_{ccp}$ during the first phase in step 560, and the charge from the second main pump passes through the second pass gate (second p-channel circuitry 250B) to provide the pump voltage $V_{ccp}$ during the second phase in step 560. The charge pump is designed symmetrically, such that during a first phase the charge pump provides a pump voltage $V_{ccp}$ using one-half of the charge pump circuit and during the second phase $V_{ccp}$ is provided using the other-half of the charge pump circuit. This process repeats itself for every charge cycle and generally hides the pre-boot time required to pre-boot the first and second main pump capacitors 240A and 240B. As a result, the charge pump circuitry 102 can run at a faster cycle time resulting in the output of more charge for a given size of capacitor.

Figure 10A:
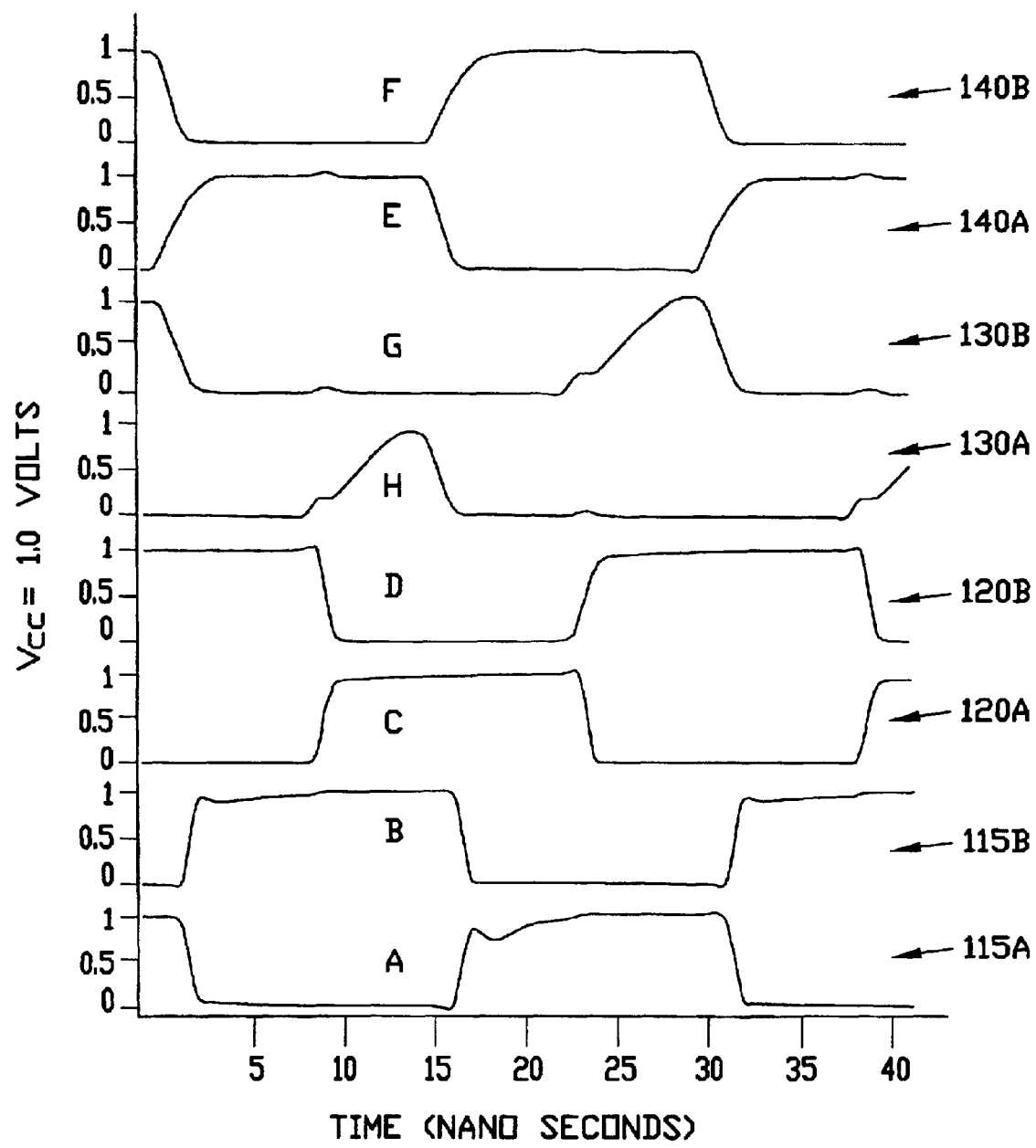
FIGS. 10A and 10B are timing diagrams illustrating generally one embodiment of signals generated at various node points when the supply voltage ($V_{cc}$) is around 1.0 volts.
Figure 10B:
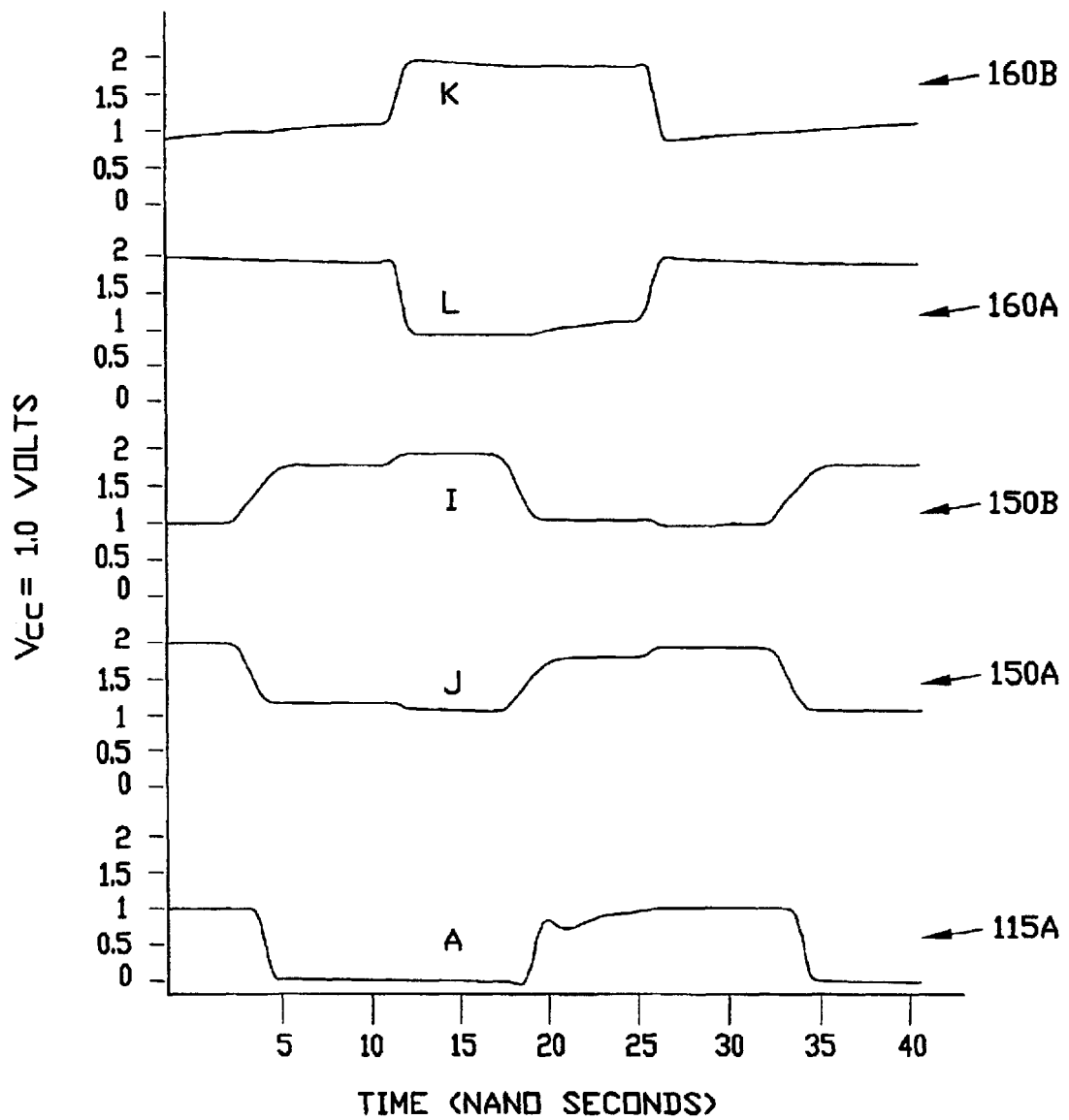

FIGS. 10A and 10B are timing diagrams illustrating generally one embodiment of signals at various node points when a supply voltage ($V_{cc}$) is around 1.0 volts. Timing diagrams 115A and 115B show first and second phase signals generated by a primary phase generator that are non-overlapping and crossing around their high points at nodes A and B during first and second phases. Timing diagrams 120A and 120B show fifth and sixth phase signals generated by a secondary phase generator (at nodes C and D) that are similar to the first and second phase signals, that are delayed from the first and second phase signals. Timing diagrams 130A and 130B show seventh and eighth phase signals generated by the primary phase generator (at nodes G and H) that are smaller instead of a half cycle, because these signals should not be recharging first and second main pump capacitors 486 and 492 while they are being pre-booted by first and second pre-boot capacitors 462 and 464, otherwise the pre-boot charges will be shunted to $V_{cc}$. Timing diagrams 140A and 140B show third and fourth signals generated by the primary phase generator (at nodes E and F), that are non over-lapping and crossing around their low points during the first and second phases. Timing diagrams 150A and 150B show that signals at nodes I and J cross around low points, similar to the signals at nodes E and F, that drive them through pre-charge capacitors 474 and 476. Also the signals at nodes I and J pre-charge the pre-boot capacitors 462 and 464 to a full $V_{cc}$ potential through pre-charge gates 468 and 469. Timing diagrams 160A and 160B show that the signals at nodes K and L cross around their high points, because they drive the p-channel circuitry 250A and 250B, which pass the final charge from the first and second main pump capacitors 486 and 492 to $V_{ccp}$. FIGS. 10A and 10B illustrate one example of the waveforms generated by the present invention resulting in a higher output voltage ($V_{ccp}$) of about 2 volts relative to the supply voltage ($V_{cc}$) of about 1 volt for this example. Similar waveforms can be generated for higher supply voltages which will provide correspondingly higher output voltage from the charge pump 102.

Figure 11:
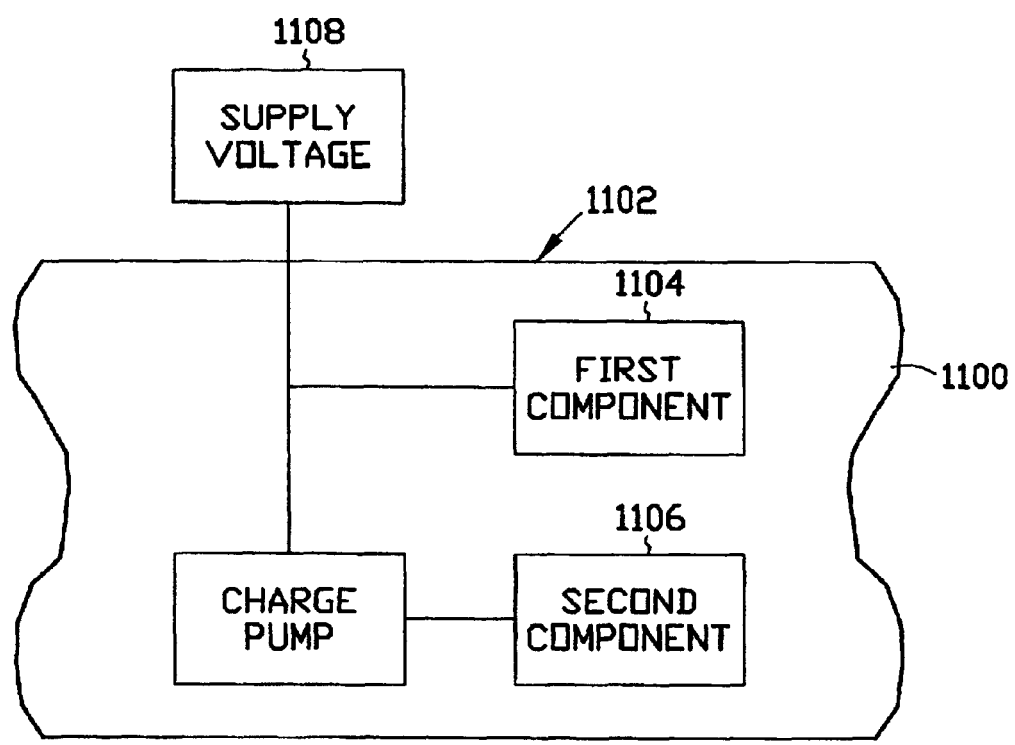
FIG. 11 is a block schematic diagram of a portion of an integrated circuit containing an electronic system for carrying out a particular function that utilizes the charge pump of the present invention.

FIG. 11 illustrates one example of an application of the charge pump of present invention. FIG. 11 shows a partial view of an integrated circuit 1100 in which an electronic system 1102 may be formed. Only a portion of the electronic system 1102 is shown in FIG. 11. The electronic system 1102 includes a first component 1104 and at least a second component 1106. The first component 1104 is coupled to an external supply voltage 1108 and operates at substantially the voltage level provided by the supply voltage 1108. The second component 1106 operates at a higher voltage level than the supply voltage 1108 and may also require a different voltage polarity. To provide the higher voltage level, a charge pump 102 in accordance with the present invention is connected between the supply voltage 1108 and the second component 1106. The system 1102 may be a computer system or any part thereof such as a display, memory module, processor or the like, or the system 1102 may be a battery operated device such as a cellular telephone, laptop computer, handheld electronic organizer or other electronic device.

Figure 12:
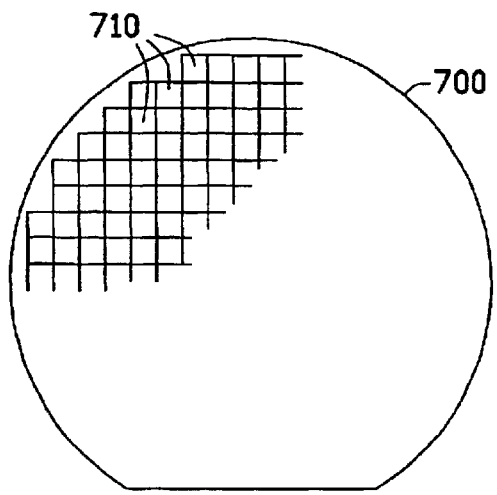
FIG. 12 is an elevation view of a substrate containing semiconductor dies.

With reference to FIG. 12, in one embodiment, a semiconductor die 710 is produced from a silicon wafer 700. A die 710 is an individual pattern, typically rectangular, on a substrate that contains circuitry to perform a specific function. A semiconductor wafer 700 will typically contain a repeated pattern of such dies 710 containing the same functionality. Die 710 may contain circuitry for the inventive charge pump, as discussed above. Die 710 may further contain additional circuitry to extend to such complex devices as a monolithic processor with multiple functionality. Die 710 is typically packaged in a protective casing (not shown) with leads extending therefrom (not shown) providing access to the circuitry of the die 710 for unilateral or bilateral communication and control.

Figure 13:
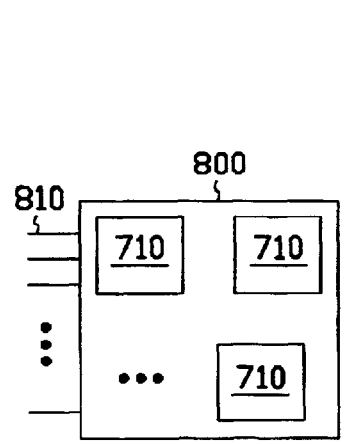
FIG. 13 is a block diagram of an exemplary circuit module.

As shown in FIG. 13, two or more dies 710 may be combined, with or without protective casing, into a circuit module 800 to enhance or extend the functionality of an individual die 710. Circuit module 800 may be a combination of dies 710 representing a variety of functions, or a combination of dies 710 containing the same functionality. Some examples of a circuit module 800 include memory modules, device drivers, power modules, communication modems, processor modules and application-specific modules and may include multi-layer, multi-chip modules. Circuit module 800 may be a sub-component of a variety of electronic systems, such as a clock, a television, a cell phone, a personal computer, an automobile, an industrial control system, an aircraft and others. Circuit module 800 will have a variety of leads 810 extending therefrom providing unilateral or bilateral communication and control.

Figure 14:
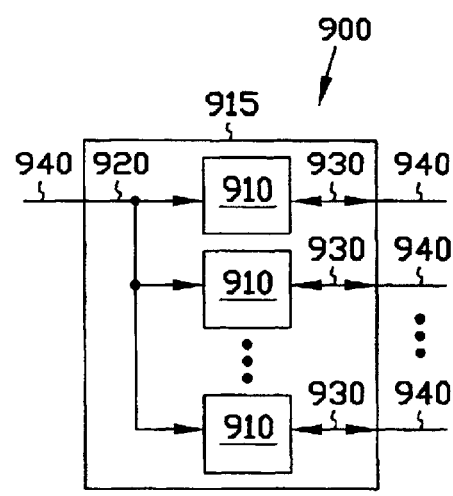
FIG. 14 is a block diagram of an exemplary memory module.

FIG. 14 shows one embodiment of a circuit module as memory module 900. Memory module 900 generally depicts a Single In-line Memory Module (SIMM) or Dual In-line Memory Module (DIAM). A SIMM or DIAM is generally a printed circuit board (PCB) or other support containing a series of memory devices. While a SIMM will have a single in-line set of contacts or leads, a DIAM will have a set of leads on each side of the support with each set representing separate I/O signals. Memory module 900 contains multiple memory devices 910 contained on support 915, the number depending upon the desired bus width and the desire for parity. Memory module 900 may contain memory devices 910 on both sides of support 915. Memory module 900 accepts a command signal from an external controller (not shown) on a command link 920 and provides for data input and data output on data links 930. The command link 920 and data links 930 are connected to leads 940 extending from the support 915. Leads 940 are shown for conceptual purposes and are not limited to the positions shown in FIG. 14.

Figure 15:
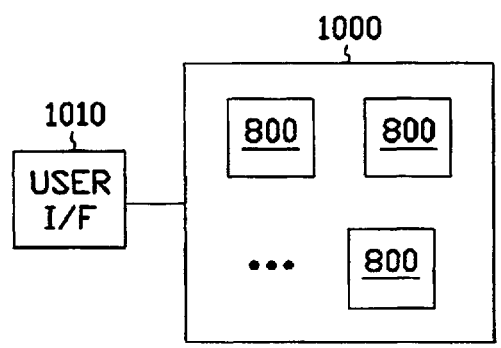
FIG. 15 is a block diagram of an exemplary electronic system.

FIG. 15 shows an electronic system 1000 containing one or more circuit modules 800. Electronic system 1000 generally contains a user interface 1010. User interface 1010 provides a user of the electronic system 1000 with some form of control or observation of the results of the electronic system 1000. Some examples of user interface 1010 include the keyboard, pointing device, monitor and printer of a personal computer; the tuning dial, display and speakers of a radio; the ignition switch and gas pedal of an automobile; and the card reader, keypad, display and currency dispenser of an automated teller machine. User interface 1010 may further describe access ports provided to electronic system 1000. Access ports are used to connect an electronic system to the more tangible user interface components previously exemplified. One or more of the circuit modules 800 may be a processor providing some form of manipulation, control or direction of inputs from or outputs to user interface 1010, or of other information either preprogrammed into, or otherwise provided to, electronic system 1000. As will be apparent from the lists of examples previously given, electronic system 1000 will often contain certain mechanical components (not shown) in addition to circuit modules 800 and user interface 1010. It will be appreciated that the one or more circuit modules 800 in electronic system 1000 can be replaced by a single integrated circuit. Furthermore, electronic system 1000 may be a sub-component of a larger electronic system.

Figure 16:
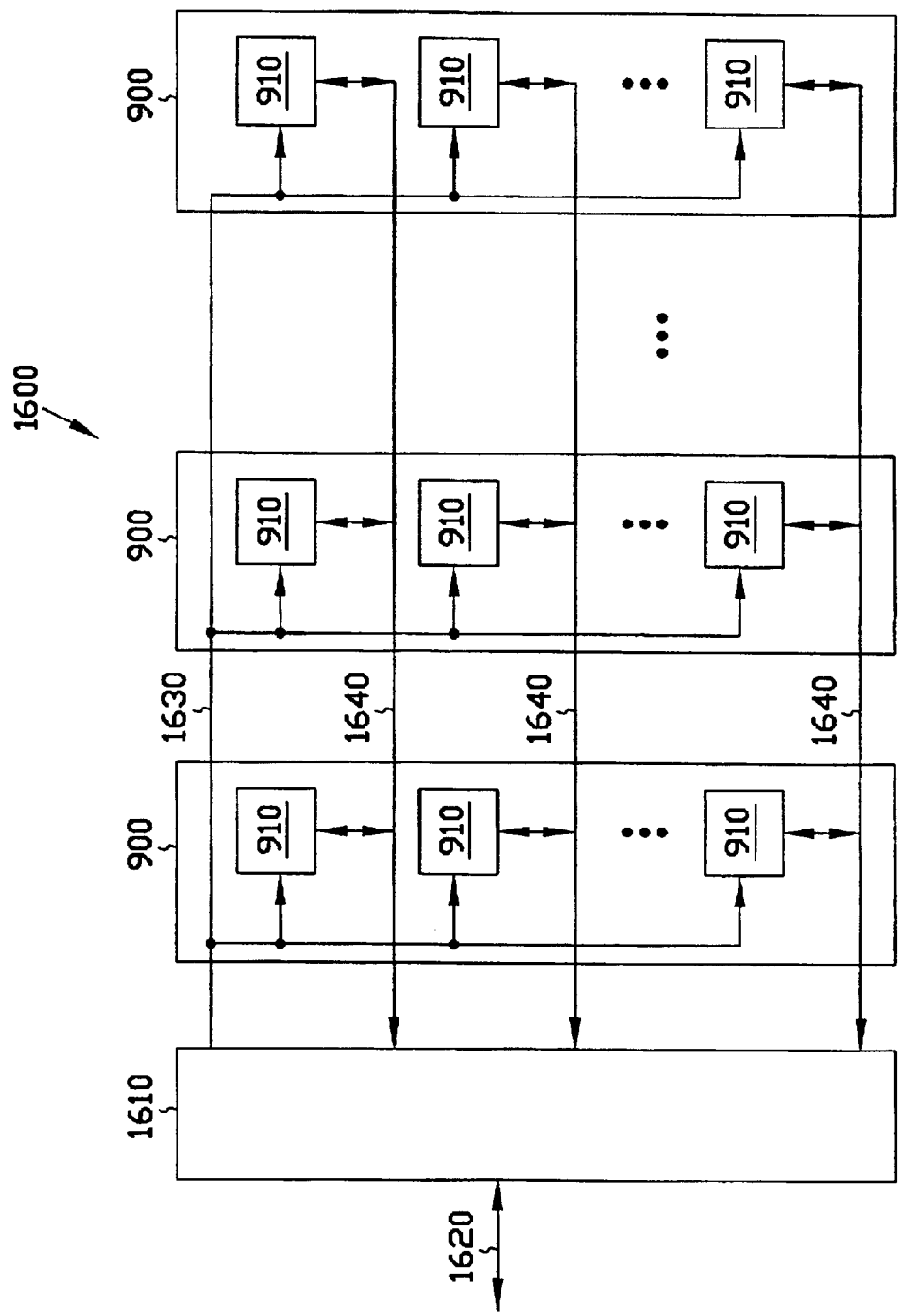
FIG. 16 is a block diagram of an exemplary memory system.

FIG. 16 shows one embodiment of an electronic system as memory system 1600. Memory system 1600 contains one or more memory modules 900 and a memory controller 1610. Memory controller 1610 provides and controls a bidirectional interface between memory system 1600 and an external system bus 1620. Memory system 1600 accepts a command signal from the external bus 1620 and relays it to the one or more memory modules 900 on a command link 1630. Memory system 1600 provides for data input and data output between the one or more memory modules 900 and external system bus 1620 on data links 1640.

Figure 17:
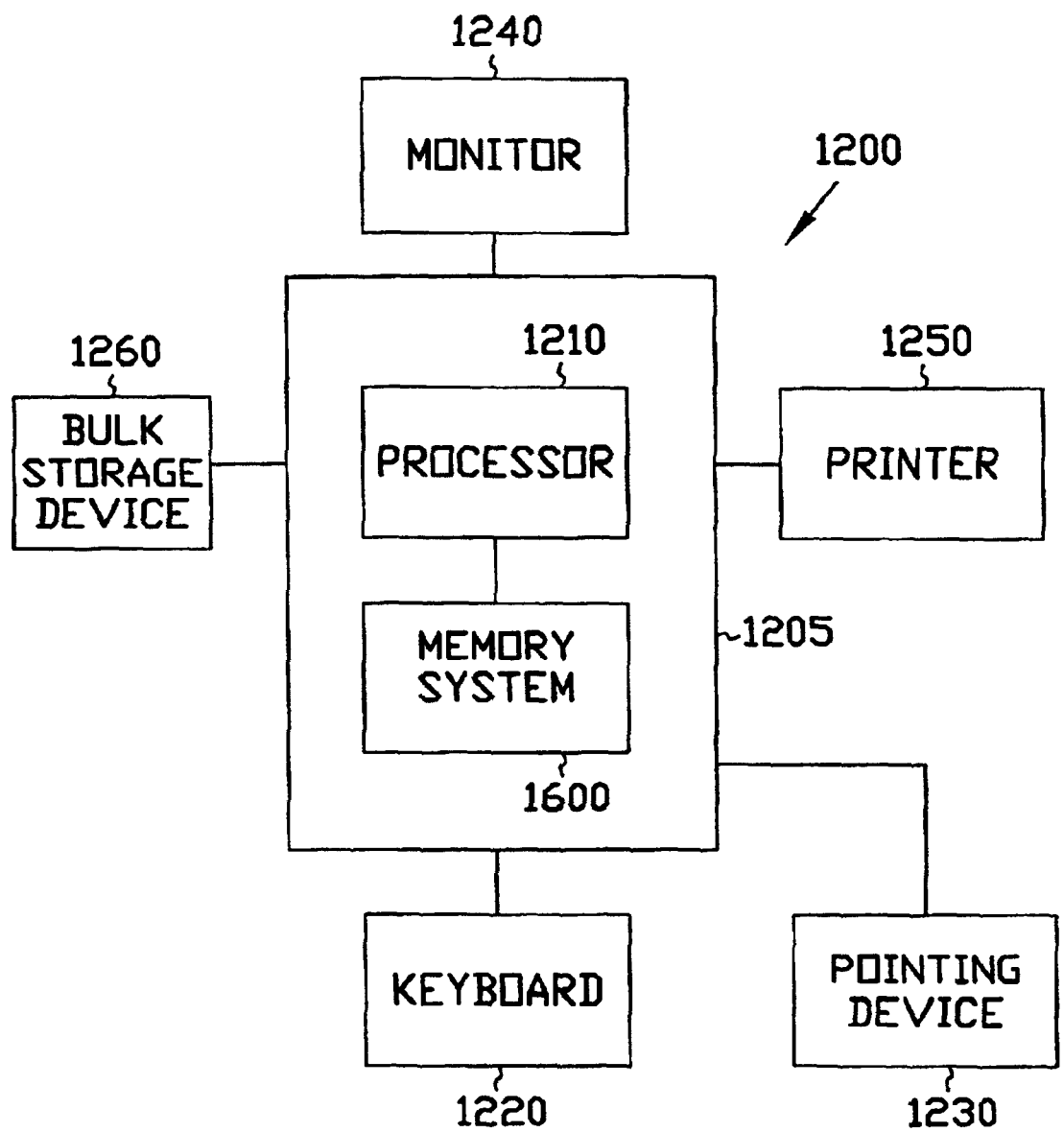
FIG. 17 is a block diagram of an exemplary computer system.

FIG. 17 shows a further embodiment of an electronic system as a computer system 1200. Computer system 1200 contains a processor 1210 and a memory system 1600 housed in a computer unit 1205. Computer system 1200 is but one example of an electronic system containing another electronic system, i.e. memory system 1600, as a sub-component. Computer system 1200 optionally contains user interface components. Depicted in FIG. 17 are a keyboard 1220, a pointing device 1230, a monitor 1240, a printer 1250 and a bulk storage device 1260. It will be appreciated that other components are often associated with computer system 1200 such as modems, device driver cards, additional storage devices, etc. It will further be appreciated that the processor 1210 and memory system 1600 of computer system 1200 can be incorporated on a single integrated circuit. Such single package processing units reduce the communication time between the processor 1210 and the memory system 1600. Any of the components of the system 1200 may operate at a voltage different from a system voltage and therefore require the voltage charge pump 102 to provide the proper level of voltage.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A charge pump, comprising:
a plurality of phase generators including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal;
wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;
first pre-boot capacitor coupled to receive the first phase signal and the third phase signal from the plurality of phase generator and second pre-boot capacitor coupled to receive the second phase signal and the fourth phase signal from the plurality of phase generators;
first main pump capacitor coupled to receive the fifth phase signal from the plurality of phase generators and coupled to the first pre-boot capacitor;
second main pump capacitor coupled to receive the sixth phase signal from the plurality of phase generators and coupled to the second pre-boot capacitor;
a blocking circuit to prevent charge from the first and second main pump capacitors from leaking back to the first and second pre-boot capacitors, wherein the blocking circuit is coupled to the plurality of phase generators to control operation of the blocking circuit; and
first and second gating devices coupled to the first and second main pump capacitors, respectively and producing therefrom a pumped voltage in excess of a supply voltage.

2. The charge pomp of claim 1, wherein the blocking circuit comprises a first pass transistor to prevent charge from leaking from the first main pump capacitor to the first pre-boot capacitor and a second pass transistor to prevent charge from leaking from the second main pump capacitor to the second pre-boot capacitor.

3. A charge pump, comprising:
a plurality of phase generators producing a first phase signal, a second phase signal, a third phase signal, a fourth phase signal, a fifth phase signal and a sixth phase signal;
wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;
first and second pre-boot capacitors coupled to the first and the third phase signals and to the second and the fourth phase signals of the plurality of phase generators;
first and second main pump capacitors coupled to the fifth and sixth phase signals of the plurality of phase generators, and to the first and second pre-boot capacitors, respectively;

a blocking circuit to prevent charge from the first and second main pump capacitors from leaking back to the first and second pre-boot capacitors, wherein the blocking circuit comprises:
   first and second priming capacitors coupled to the plurality of phase generators; and
   first and second pass transistors coupled respectively to the first and second priming capacitors, wherein the pass transistors are controlled by the first and second priming capacitors to prevent charge from leaking from the main pump capacitors to the pre-boot capacitors; and first and second gating devices coupled to the first and second main pump capacitors, respectively.

4. A charge pump, comprising:

a plurality of phase generators;

first and second pre-boot capacitors coupled to the plurality of phase generators;

first and second main pump capacitors coupled to the plurality of phase generators, and the first and second pre-boot capacitors, respectively;

a blocking circuit to prevent charge from the first and second main pump capacitor from leaking back to the first and second pre-boot capacitors; and first and second gating devices coupled to the first and second main pump capacitors, respectively, first and second main pump pre-charge capacitors and wherein:

the first pre-boot capacitor pre-boots the first main pump capacitor to a first predetermined level during a first phase in response to receiving second and third phase signals from the plurality of phase generators;

the second pre-boot capacitor pre-boots the second main pump capacitor to the first predetermined level during a second phase in response to receiving first and fourth phase signals from the plurality of phase generators;

the first main pump pre-charge capacitor pre-charges the first main pump capacitor to a second predetermined level during the second phase in response to the first main pump pre-charge capacitor receiving a seventh phase signal from the plurality of phase generators;

the second main pump pre-charge capacitor pre-charges the second main pump capacitor to the second predetermined level during the first phase in response to the second main pump pre-charge capacitor receiving an eighth phase signal from the plurality of phase generators;

the first main pump capacitor is charged to a third predetermined level in response to receiving a fifth phase signal from the plurality of phase generators and a charge is outputted from the first main pump capacitor during the first phase; and the second main pump capacitor is charged to a third predetermined level in response a receiving a sixth phase signal from the plurality of phase generators and another charge is outputted from the second main pump capacitor during the second phase.

5. A charge pump, comprising:

first and second pre-boot capacitors driven by a first phase signal, a second base signal, a third phase signal and a fourth phase signal, wherein the first phase signal and the second phase signal are non-overlapping and crossing around high points during every phase cycle and the third phase signal and the fourth phase signal are non-overlapping and crossing around low points during every phase cycle;

first and second main pump capacitors coupled to the first and second pre-boot capacitors and coupled to a fifth phase signal and a sixth phase signal wherein the fifth phase signal and the sixth phase signal are non-overlapping and crossing around high points during every phase cycle; and a blocking circuit to prevent charge from the first and second main pump capacitors from leaking back to the first and second pre-boot capacitors in response to the third and fourth phase signals, wherein the blocking circuit includes;

a priming capacitor, and a pass transistor controlled by the priming capacitor.

6. A charge pump, comprising:

a phase generator including a first primary phase generator producing a first phase signal and a third phase signal and a second primary phase generator producing a second phase signal and a fourth phase signal;

wherein the first phase signal and second phase signal are non-overlapping and crossing around high points during every phase cycle and the third phase signal and the fourth phase signal are non-overlapping and crossing around low points during every phase cycle;

a charge storage device;

a pre-charge circuit for charging the charge storage device to a charge level to provide a pumped output voltage from the charge pump;

a blocking circuit to prevent charge leakage from the charge storage device to the pre-charge circuit, wherein the blocking circuit is coupled to the phase generator to control operation of the blocking circuit in response to the third phase signal and the fourth phase signal; and wherein the charge storage device further includes a first and second main pump capacitors which are pre-booted to a first predetermined level by a first and second pre-boot capacitors within the pre-charge circuit during a first and a second phases cycles, respectively, wherein the first predetermined level is moved to a second predetermined level in response to the plurality of phase generators during the first and second phase cycles, respectively, wherein the second predetermined level is moved to a third predetermined level in response to the plurality of phase generators during the first and second phase cycles, respectively, and wherein the third predetermined level is transferred to a first and a second gating devices in the blocking circuit during the first and second phase cycles, respectively.

7. The charge pump of claim 6, wherein the pre-charge circuit further comprises a plurality of phase generators including a first secondary phase generator producing a fifth phase signal, and a second secondary phase generator producing a sixth phase signal, and the fifth phase signal and the sixth phase signal are non-overlapping and crossing around high points during every phase cycle and at least one pre-boot capacitor to pre-charge the charge storage device to the charge level to provide the predetermined output voltage.

8. A charge pump, comprising:

a charge storage device;

a phase generator circuit including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal;

wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

a pre-charge circuit for charging the charge storage device to a charge level to provide a predetermined output voltage from the charge pump; and a blocking circuit to prevent charge leakage from the charge storage device to the pre-charge circuit, wherein the blocking circuit comprises:

a priming capacitor coupled to the pre-charge circuit; and a pass transistor coupled to the priming capacitor, wherein the priming capacitor controls operation of the pass transistor to prevent charge from leaking from the charge storage device to the pre-charge circuit in response to the third phase signal and the fourth phase signal.

9. The charge pump of claim 6, wherein the blocking circuit comprises a pass transistor coupled between the charge storage device and the pre-charge circuit.

10. A charge pump, comprising:

a plurality of phase generators including a first primary phase generator producing a first phase signal and a third phase signal and a second primary phase generator producing a second phase signal and a fourth phase signal;

wherein the first phase signal and second phase signal are non-overlapping and crossing around high points during every phase cycle and the third phase signal and the fourth phase signal are non-overlapping and crossing around low points during every phase cycle;

a first main pump capacitor;

a second main pump capacitor;

a pre-charge capacitor circuit coupled between each of the first and second main pump capacitors and the plurality of phase generators to pre-charge each of the first and second main pump capacitors to a predetermined charge level;

a blocking circuit to prevent leakage of charge from the first and second main pump capacitors to the plurality of pre-charge capacitor circuits, wherein the blocking circuit is coupled to one of the plurality of phase generators to control operation of the blocking circuit; and wherein the first main pump capacitor and the second main pump capacitor are pre-booted to a first predetermined level by the pre-charge capacitor circuit during a first and second phase cycles, respectively, wherein the first predetermined level is moved to a second predetermined level in response to the plurality of phase generators during the first and second phase cycles, respectively, wherein the second predetermined level is moved to a third predetermined level in response to the plurality of phase generators during the first and second phase cycles, respectively, and wherein the third predetermined level is transferred to the first and a second gating devices, during the first and second phase cycles, respectively.

11. The charge pump of claim 10, wherein the blocking circuit comprises a pass transistor.

12. A two phase cycle charge pump, comprising:

a plurality of phase generators including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal;

wherein the first phase signal and the second phase signal are non-overlapping signals which cross around high points during every phase cycle, the third phase signal and the fourth phase signal are non-overlapping signals which cross around low points during every phase cycle, and the fifth phase signal and the sixth phase signal are non-overlapping signal which cross around high points during every phase cycle;

a first main pump capacitor;

a second main pump capacitor;

a first and second pre-charge capacitor circuit coupled between each of the first and second main pump capacitors and the plurality of phase generators to pre-charge each of the first and second main pump capacitors to a predetermined charge level; and a blocking circuit to prevent leakage of charge from the first and second main pump capacitors to the pre-charge capacitor circuits, wherein the blocking circuit comprises:

a priming capacitor circuit coupled to the plurality of phase generators; and a pass transistor controlled by the priming capacitor circuit to prevent charge from leaking from the main pump capacitors to the pre-charge capacitor circuits in response to the third and fourth phase signals; and wherein the first and second main pump capacitors are pre-booted to a first wherein the first and second main pump capacitors are pre-booted to a first predetermined level by the first and second pre-charge capacitor circuits during a first and a second phase cycles, respectively, wherein the first predetermined level is moved to a second predetermined level in response to the plurality of phase generators during the first and second phase cycles, respectively, wherein the second predetermined level is moved to a third predetermined level in response to the plurality of phase generators during the first and second phase cycles, respectively, and wherein the third predetermined level is transferred to the first and a second gating devices, during the first and second phase cycles, respectively.

13. The charge pump of claim 12, wherein an output voltage larger than an input voltage by a predetermined amount is outputted by the charge pump in response to the main pump capacitors being charged to a predetermined charge level.

14. A two phase cycle charge pump, comprising:

a plurality of phase generators including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal;

wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

a first main pump capacitor;

a second main pump capacitor;

a plurality of pre-charge capacitor circuits including a first pre-boot capacitor and a second pre-boot capacitor coupled respectively between each of the first and second main pump capacitors and the plurality of phase generators to pre-charge each of the first and second main pump capacitors to a predetermined charge level, wherein an output voltage larger than an input voltage by a predetermined amount is output by the first and second main pump capacitors in response to reaching the predetermined charge level;

a blocking circuit to prevent charge from leaking from the first and second main pump capacitors to the plurality of pre-charge capacitor circuits, wherein the blocking circuit is coupled to one of the plurality of phase generators to control operation of the blocking circuit in response to the third and fourth phase signals;

wherein in the first phase of the two-phase cycle, the first main pump capacitor receives the fifth phase signal from the first secondary phase generator and outputs a charge to a first p-channel circuit while the second main pump capacitor is getting pre-booted to a predetermined boot level by the second pre-boot capacitor; and wherein in the second phase of the two phase cycle, the second main pump capacitor receives the sixth phase signal from the second secondary phase generate and outputs the charge to a second p-channel circuit while the first main pump capacitor is getting pre-booted to the predetermined boot level by the first pre-boot circuit.

15. The charge pump of claim 14, wherein the blocking circuit comprises a first pass transistor coupled between the first main pump capacitor and the plurality of pre-charge capacitor circuits and a second pass transistor coupled between the second main pump capacitor and the plurality of pre-charge capacitor circuits.

16. A charge pump, comprising:

a plurality of phase generators including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal;

wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

first pre-boot capacitor coupled to receive the first phase signal and the third base signal from the plurality of phase generators and second pre-boot capacitor coupled to receive the second phase signal and the fourth phase signal from the plurality of phase generators;

first main pump capacitor coupled to receive the fifth phase signal from the plurality of phase generators and coupled to the first pre-boot capacitor;

second main pump capacitor coupled to receive the sixth phase signal from the plurality of phase generators and coupled to the second pre-boot capacitor;

a plurality of pre-charge capacitor circuits coupled respectively between each of the first and second main pump capacitors and the plurality of phase generators to pre-charge each of the first and second main pump capacitors to a predetermined charge level, wherein an output voltage larger than an input voltage by a predetermined amount is output by the first and second main pump capacitors in response to reaching the predetermined charge level; and a blocking circuit to prevent charge from leaking from the first and second main pump capacitors to the plurality of pre-charge capacitor circuits, wherein the blocking circuit comprises:

a priming capacitor circuit coupled to the plurality of phase generators; and a pass transistor coupled to the priming capacitor circuit wherein the pass transistor is shut off by the priming capacitor circuit when the main pump capacitors are switched to prevent charge from leaking from the main pump capacitors to the plurality of pre-charge capacitor circuits in response to the third and fourth phase signals;

wherein in a first phase of the two-phase cycle, the first main pump capacitor receives the fifth phase signal from the first secondary phase generator and outputs a charge to a first p-channel circuit while the second main pump capacitor is getting pre-booted to a predetermined boot level by the second pre-boot capacitor; and wherein in a second phase of the two phase cycle, the second main pump capacitor receives the sixth phase signal from the second secondary phase generator and outputs the charge to a second p-channel circuit while the first main pump capacitor is getting pre-booted to the predetermined boot level by the first pre-boot circuit.

17. A charge pump, comprising:

an oscillator to generate a first and a second phase during a phase cycle;

a primary phase generator coupled to the oscillator and operable for producing a first phase signal, a second phase signal; a third phase signal and a fourth phase signal;

a secondary phase generator coupled to the primary phase generator and operable for producing a fifth phase signal and a sixth phase signal;

first and second pre-boot capacitors coupled to the primary phase generator;

first and second main pump capacitors coupled to the secondary phase generator, and the first and second pre-boot capacitors, respectively;

first and second blocking circuits to prevent charge from leaking from the first and second main pump capacitors to the first and second pre-boot capacitors, wherein the primary phase generator and the secondary phase generator are coupled respectively to the first and second blocking circuits to control operation of the first and second blocking circuits;

first and second gating devices coupled to the first and second main pump capacitors, respectively; and wherein the first and second main pump capacitors are charged to a predetermined level to output a higher voltage than an input voltage;

wherein in a first phase of the phase cycle, the first main pump capacitor receives the fifth phase signal from the first secondary phase generator and outputs a charge to first p-channel circuit while the second main pump capacitor is getting pre-booted to a predetermined boot level by the second pre-boot capacitor; and wherein in a second phase of the phase cycle, the second main pump capacitor receives the sixth phase signal from the second secondary phase generator and outputs the charge to a second p-channel circuit while the first main pump capacitor is getting pre-booted to the predetermined boot level by the first pre-boot circuit.

18. A charge pump, comprising:

an oscillator to generate a first and a second phase during a phase cycle;

first and second primary phase generators coupled to the oscillator and operable for producing a first and third phase signals, and a second and fourth phase signals, respectively;

first and second secondary phase generators coupled to the first and second primary phase generators, respectively, and operable for producing a fifth and sixth phase signals, respectively;

first and second pre-boot capacitor circuits cross-coupled to the first and second primary phase generators, respectively;

a first main pump capacitor coupled to the first secondary phase generator, and the first pre-boot capacitor circuit;

a second main pump capacitor coupled to the second secondary phase generator, and the second pre-boot capacitor;

a first blocking circuit to prevent charge from leaking from the first main pump capacitor to the first pre-boot capacitor circuit, wherein operation of the first blocking circuit is controlled by one of the phase generators;

a second blocking circuit to prevent charge from leaking from the second main pump capacitor to the second pre-boot capacitor circuit, wherein operation of the second blocking circuit is controlled by one the phase generators;

first and second gates coupled to the first and second main pump capacitors, respectively, wherein the first and second main pump capacitors are successively pre-charged to higher levels to output a predetermined voltage level higher than an input voltage level wherein in a first phase of the two-phase cycle, the first main pump capacitor receives the fifth phase signal from the first secondary phase generator and outputs a charge a first p-channel circuit while the second main pump capacitor is getting pre-booted to a predetermined boot level by the second pre-boot capacitor; and wherein in a second phase of the two phase cycle, the second main pump capacitor receives the sixth phase signal from the second secondary phase generator and outputs the charge to a second p-channel circuit while the first main pump capacitor is getting pre-booted to the predetermined boot level by the first pre-boot circuit.

19. An electronic system, comprising:

at least one component operating at a predetermined voltage higher than a supply voltage;

a charge pump to generate the predetermined voltage, said charge pump comprising:

a charge storage device;

a phase generator circuit including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal;

wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

a pre-charge circuit to pre-charge the charge storage device to provide the predetermined voltage; and a blocking circuit to prevent charge from leaking from the charge storage device to the pre-charge circuit, wherein the blocking circuit includes:

a priming capacitor; and a pass transistor coupled to the priming capacitor, wherein the priming capacitor controls operation of the pass transistor to prevent charge from leaking form the charge storage device to the pre-charge circuit in response to the third phase signal and the fourth phase signal.

20. The electronic system of claim 19, wherein the predetermined voltage is derived from the supply voltage.

21. An electronic system, comprising:

at least one component operating at a predetermined voltage higher than system voltage;

a charge pump to generate the predetermined voltage, said charge pump comprising:

a plurality of phase generators including a first primary phase generator producing a first phase signal and a third phase signal and a second primary phase generator reducing a second phase signal and a fourth phase signal;

wherein the first phase signal and second phase signal are non-overlapping and crossing around high points during every phase cycle and the third phase signal an the fourth phase signal are non-overlapping and crossing around low points during every phase cycle;

a first main pump capacitor;

a second main pump capacitor;

a pre-charge circuit coupled between each of the first and second main pump capacitors and the plurality of phase generators to pre-charge each of the first and second main pump capacitors to a predetermined charge level;

a blocking circuit to prevent leakage of charge from the first and second main pump capacitors to pre-charge circuit, wherein the blocking circuit is coupled to one of the plurality of phase generators to control operation of the blocking circuit; and wherein the first main pump capacitor and the second main pump capacitor are pre-booted to a first predetermined level by the pre-charge capacitor circuit during a first and a second phase cycles, respectively, wherein the first predetermined level is moved to a second predetermined level in response to the plurality of phase generators during the first and second phase cycles, respectively, wherein the second predetermined level is moved to a third predetermined level in response to the plurality of phase generators during the first and second phase cycles, respectively, and wherein the third predetermined level is transferred to the first and a second gating devices, during the first and second phase cycles, respectively.

22. An electronic system, comprising:
   at least one component operating at a predetermined voltage higher than a supply voltage;
   a charge pump to generate the predetermined voltage, said charge pump comprising:
   a plurality of phase generators including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal;
   wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;
   first pre-boot capacitor coupled to receive the first phase signal and the third phase signal from the plurality of phase generators and second pre-boot capacitor coupled to receive the second phase signal and the fourth phase signal from the plurality of phase generators;
   first main pump capacitor coupled to receive the fifth phase signal from the plurality of phase generators and coupled to the first pre-boot capacitor;
   second main pump capacitor coupled to receive the sixth phase signal from the plurality of phase generators and coupled to the second pre-boot capacitor;
   a blocking circuit to prevent charge from the first and second main pump capacitors from leaking back to the first and second pre-boot capacitors, wherein the blocking circuit is coupled to at least one of the plurality of phase generators to control operation of the blocking circuit.

23. An electronic system, comprising:
   at least one component operating at a predetermined voltage higher than a supply voltage;
   a charge pump to generate the predetermined voltage, said charge pump comprising:
   a plurality of phase generators including a first primary phase generator producing a first phase signal and a third phase signal and a second primary phase generator producing a second phase signal and a fourth phase signal;
   wherein the first phase signal and second phase signal are non-overlapping and crossing around high points during every phase cycle and the third phase signal and the fourth phase signal are non-overlapping and crossing around low points during every phase cycle;
   a first main pump capacitor;
   a second main pump capacitor;
   a plurality of pre-charge capacitor circuits coupled respectively between each of the first and second main pump capacitors and the plurality of phase generators to pre-charge each of the first and second main pump capacitors to a predetermined charge level, wherein an output voltage larger than an input voltage by a predetermined amount outputted by the first and second main pump capacitors in response to reaching the predetermined charge level;
   a blocking circuit coupled between the first and second main pump capacitors and the plurality of pre-charge capacitor circuits to prevent leakage of charge from the first and second main pumps to the plurality of pre-charge capacitor circuits, the blocking circuit comprising:
   a priming capacitor circuit coupled to the plurality of phase generators; and
   a pass transistor coupled between to the priming capacitor circuit an each of the pre-charge capacitor circuits, wherein each pass transistor is shut off by the priming capacitor circuit when the main pump capacitors are switched to prevent charge from leaking from the main pump capacitors to the plurality of pre-charge capacitor circuits.

24. A computer system, comprising:
   a processor;
   a memory system coupled to the processor;
   a charge pump coupled to at least one of the processor and the memory system, wherein the charge pump comprises:
   a charge storage device;
   a phase generator circuit including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal, wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;
   a pre-charge circuit to pre-charge the charge storage device to provide the predetermined voltage; and
   a blocking circuit to prevent charge from leaking from the charge storage device to the pre-charge circuit, wherein the blocking circuit includes:
   a priming capacitor coupled to the pre-charge circuit; and
   a pass transistor coupled to the priming capacitor, wherein the priming capacitor controls operation of the pass transistor to prevent charge from leaking from the charge storage device to the pre-charge circuit.

25. A computer system, comprising:
   a processor;
   a memory system coupled to the processor;
   a charge pump coupled to at least one of the processor and the memory system, wherein the charge pump comprises:
   a phase generator including a first primary phase generator producing first phase signal and a third phase signal and a second primary phase generator producing a second phase signal and a fourth phase signal, wherein the first phase signal and second phase signal are non-overlapping and crossing around high points during every phase cycle and the third phase signal and the fourth phase signal are non-overlapping and crossing around low points during every phase cycle;

a first main pump;
a second main pump; and
a pre-charge circuit coupled between each of the first and second main pumps and the plurality of phase generators to pre-charge each of the first and second main pumps to a pumped charge level;
a blocking circuit coupled between the first and second main pumps and the pre-charge circuit to prevent leakage of charge from the first and second main pumps to the pre-charge circuit, wherein the blocking circuit is coupled to the phase generator to control operation of the blocking circuit in response to the third phase signal and the fourth phase signal; and wherein the first and the second main pump capacitors are pre-booted to a first predetermined level by a first and second pre-boot capacitors within the pre-charge circuit during a first and a second phase cycles, respectively, wherein the first predetermined level is moved to a second predetermined level in response to the phase generator during the first and second phase cycles, respectively, wherein the second predetermined level is moved to a third predetermined level in response to the phase generator during the first and second phase cycles, respectively, and wherein the third predetermined level is transferred to a first and a second gating devices in the blocking circuit during the first and second phase cycles, respectively.

26. A computer system, comprising:
a processor;
a memory system coupled to the processor;
a charge pump coupled to at least one of the processor and the memory system, wherein the charge pump comprises:
 a plurality of phase generators including a first primary phase generator producing a first phase signal and a third phase signal and a second primary phase generator producing a second phase signal and a fourth phase signal, wherein the first phase signal and second phase signal are non-overlapping and crossing around high points during every phase cycle and the third phase signal and the fourth phase signal are non-overlapping and crossing around low points during every phase cycle;
 a first main pump capacitor;
 a second main pump capacitor;
 a plurality of pre-charge capacitor circuits coupled respectively between each of the lust and second main pump capacitors and the plurality of phase generators to pre-charge each of the first and second main pump capacitors to a predetermined charge level, wherein an output voltage larger than an input voltage by a predetermined amount is outputted by the first and second main pump capacitors in response to reaching the predetermined charge level; and
 a blocking circuit to prevent leakage of charge from the first and second main pump capacitors to the plurality of pre-charge capacitor circuits, the blocking circuit including:
  a priming capacitor; and
  a pass transistor controlled by the priming capacitor,
wherein the first and the second main pump capacitors are pre-booted to a first predetermined level by a first and second pre-boot capacitors within the pre-charge circuit during a first and a second phase cycles, respectively, wherein the first predetermined level is moved to a second predetermined level in response to the phase generator during the first and second phase cycles, respectively, wherein the second predetermined level is moved to a third predetermined level in response to the phase generator during the first and second phase cycles, respectively, and wherein the third predetermined level is transferred to a first and a second gating devices in the blocking circuit during the first and second phase cycles, respectively.

27. A semiconductor die, comprising:
a substrate; and
an integrated circuit supported by the substrate, wherein the integrated circuit includes at least one charge pump comprising:
 a plurality of phase generators including a first primary phase generator producing a first phase signal and a third phase signal, a first secondary phase generator producing a fifth phase signal a second primary phase generator producing a second phase signal and a fourth phase signal, and a second secondary phase generator producing a sixth phase signal wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;
 first pre-boot capacitor coupled to receive the first phase signal and the third phase signal front the plurality of phase generators and second pre-boot capacitor coupled to receive the second phase signal and the fourth phase signal from the plurality of phase generators;
 first main pump capacitor coupled to receive the fifth phase signal from the plurality of phase generators and coupled to the first pre-boot capacitor;
 second main pump capacitor coupled to receive the sixth phase signal from the plurality of phase generators and coupled to the second pre-boot capacitor;
 a blocking circuit to prevent charge front the first and second main pump capacitors from leaking back to the first and second pre-boot capacitors, wherein de blocking circuit is coupled to at least one of the plurality of phase generators to control operation of the blocking circuit; and
 first and second gating devices coupled to the first and second main pump capacitors, respectively.

28. A semiconductor die, comprising:
a substrate; and
an integrated circuit supported by the substrate, wherein the integrated circuit includes at least one charge pump comprising:
 first and second pre-boot capacitors driven by a first phase signal, a second phase signal, a third phase signal end a fourth phase signal, wherein the first phase signal and the second phase signal are non-overlapping and crossing around high points during every phase cycle and the third phase signal and the fourth phase signal are non-overlapping and crossing around low points during every phase cycle;
 first and second main pump capacitors coupled to the first and second pre-boot capacitors and coupled to a fifth phase signal and a sixth phase signal wherein the fifth phase signal and the sixth phase signal are non-overlapping and crossing around high points during every phase cycle; and a blocking circuit to prevent charge from the first and second main pump capacitors from leaking back to the first and second pre-boot capacitors, wherein the blocking circuit includes:

a priming capacitor; and a pass transistor coupled to the priming capacitor, wherein the priming capacitor controls operation of the pass transistor.

29. A semiconductor die, comprising:

a substrate; and an integrated circuit supported by the substrate, wherein the integrate circuit includes at least one charge pump comprising:

a charge storage device;

a phase generator circuit including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

a pre-charge circuit to pre-charge the charge storage device to provide the predetermined voltage; and a blocking circuit to prevent charge from leaking from the charge storage device to the pre-charge circuit, wherein the blocking circuit includes:

a priming capacitor coupled to the pre-charge circuit; and a pass transistor coupled to the priming capacitor, wherein the priming capacitor controls operation of the pass transistor to prevent charge from leaking from the charge storage device to the pre-charge circuit.

30. A semiconductor die, comprising:

a substrate; and an integrated circuit supported by the substrate, wherein the integrated circuit includes at least one charge pump comprising:

a phase generator including a first primary phase generator producing a first phase signal and a third phase signal and a second primary phase generator producing a second phase signal and a fourth phase signal wherein the first phase signal and second phase signal are non-overlapping and crossing around high points during every phase cycle and the third phase signal and the fourth phase signal are non-overlapping and crossing around low points during every phase cycle;

a charge storage device;

a pre-charge circuit to pre-charging the charge storage device to provide a pumped voltage from the at least one charge pump;

a blocking circuit to prevent charge from leaking from the charge storage device to the pre-charge circuit, the blocking circuit comprising a pass transistor coupled between the charge storage device and the pre-charge circuit, wherein the blocking circuit is coupled to the phase generator to control operation of the blocking circuit in response to the third phase signal and the fourth phase signal; and wherein the charge storage device further includes first and second main pump capacitors which are pre-booted to a first predetermined level by a first and second pre-boot capacitors within the pre-charge circuit a first and a second phase cycle, respectively, wherein the first predetermined level is moved to a second predetermined level in response to the plurality of phase generators during the first and second phase cycles, respectively, wherein the second predetermined level is moved to a third predetermined level in response to the plurality of phase generators during the first and second phase cycles, respectively, and wherein the third predetermined level is transferred to a first and a second gating devices in the blocking circuit during the first and second phase cycles, respectively.

31. A semiconductor die, comprising:

a substrate; and an integrated circuit supported by the substrate, wherein the integrated circuit includes at least one charge pump comprising:

a plurality of phase generators including a first primary phase generator producing a first phase signal and a third phase signal and a second primary phase generator producing a second phase signal and a fourth phase signal wherein the first phase signal and second phase signal are non-overlapping and crossing around high points during every phase cycle and the third phase signal and the fourth phase signal are non-overlapping and crossing around low points during every phase cycle;

a first main pump capacitor;

a second main pump capacitor;

a plurality of pre-charge capacitor circuits coupled respectively between each of the first and second main pump capacitors and the plurality of phase generators to pre-charge each of the first and second main pump capacitors to predetermined charge level, wherein an output voltage larger than an input voltage by a predetermined amount is outputted by the first and second main pump capacitors in response to reaching the predetermined charge level;

a blocking circuit coupled between the first and second main pump capacitors and the plurality of pre-charge capacitor circuits to prevent leakage of charge from the first and second main pumps to the plurality of pre-charge capacitor circuits, the blocking circuit comprising:

a priming capacitor circuit coupled to the plurality of phase generators; and a pass transistor coupled between to the priming capacitor circuit and each of the pre-charge capacitor circuits, wherein each pass transistor is shut off by the priming capacitor circuit when the main pump capacitors are switched to prevent charge from leaking from the main pump capacitors to the plurality of pre-charge capacitor circuits; and wherein the first main pump capacitor and the second main pump capacitor are pre-booted to a first predetermined level by the pre-charge capacitor circuit during a first and a second phase cycles, respectively, wherein the first predetermined level is moved to a second predetermined level in response to the plurality of phase generators during the first and second phase cycles, respectively, wherein the second predetermined level is moved to a third predetermined level in response to the plurality of phase generators during the first and second phase cycles, respectively, end wherein the third predetermined level is transferred to the first and a second gating devices, during the first and second phase cycles, respectively.

32. A method for generating a voltage higher than a supply voltage, comprising:
generating a plurality of signals;
boosting a charge level of a charge storage device in response to the plurality of signals;
wherein boosting the level of the charge storage device comprises:
  pre-charging a first main pump capacitor to a first predetermined charge level responsive to a first pre-boot capacitor receiving a second and third phase signal;
  pre-charging a second main pump capacitor to the first predetermined charge level responsive to a second pre-boot capacitor receiving a first and fourth phase signal;
  pre-charging the first main pump capacitor to a second predetermined charge level responsive to a first pre-charge capacitor receiving a fifth phase signal;
  pre-charging the second main pump capacitor to the second predetermined charge level responsive to a second pre-charge capacitor receiving an sixth phase signal;
  outputting a boosted voltage when the charge level of the charge storage device reaches a predetermined level; and
  repeating a cycle of boosting the charge level of the charge storage device while blocking charge leakage from the first and second main pump capacitors to the first and second pre-boot capacitors.

33. A method to generate a voltage higher than a supply voltage, comprising:
generating a plurality of signals;
boosting a charge level of a charge storage device in response to the plurality of signals, wherein boosting the level of a charge storage device comprises:
  pre-charging a first main pump capacitor to a first predetermined charge level responsive to a first pre-boot capacitor receiving a second and third phase signal;
  pre-charging a second main pump capacitor to the first predetermined charge level responsive to a second pre-boot capacitor receiving a first and fourth phase signal;
  pre-charging the firm main pump capacitor to a second predetermined charge level responsive to a first pre-charge capacitor receiving a seventh phase signal;
  pre-charging the second main pump capacitor to the second predetermined charge level responsive to a second pre-charge capacitor receiving an eighth phase signal;
  pre-charging the first main pump capacitor to a third predetermined charge level responsive to the first main pump capacitor receiving a fifth phase signal; and
  pre-charging the second main pump capacitor to the third predetermined charge level responsive to the second main pump capacitor receiving a sixth phase signal; and
  outputting a boosted voltage when the charge level of the charge storage device reaches a predetermined level; and
  repeating a cycle of boosting the charge level of the charge storage device.

34. A method of generating a boosted voltage higher than a supply voltage on a charge storage device comprising:
pre-charging a first main pump capacitor to a first predetermined charge level responsive to a first pre-boot capacitor receiving a second and third phase signal;
pre-charging a second main pump capacitor to the first predetermined charge level responsive to a second pre-boot capacitor receiving a first and fourth phase signal;
pre-charging the first main pump capacitor to a second predetermined charge level responsive to a first pre-charge capacitor receiving a seventh phase signal;
pre-charging the second main pump capacitor to the second predetermined charge level responsive to a second pre-charge capacitor receiving an eighth phase signal;
pre-charging the first main pump capacitor to a third predetermined charge level responsive to the first main pump capacitor receiving a fifth phase signal;
pre-charging the second main pump capacitor to the third predetermined charge level responsive to the second main pump capacitor receiving a sixth phase signal; and
outputting the boosted voltage when the charge level of the charge storage device reaches a predetermined level;
repeating a cycle of generating the boosted voltage on the charge storage device.

35. A method for making a charge pump, comprising:
forming a plurality of phase generators including forming a first primary phase generator for producing a first phase signal and a third phase signal, forming a first secondary phase generator for producing a fifth phase signal, forming a second primary phase generator for producing a second phase signal and a fourth phase signal, and forming a second secondary phase generator for producing a sixth phase signal wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;
coupling first pre-boot capacitor to receive the first phase signal and to receive the third phase signal from the plurality of phase generators and coupling second pre-boot capacitor to receive the second phase signal and the fourth phase signal from the plurality of phase generators;
coupling first main pump capacitor to receive the fifth phase signal from the plurality of phase generators and to the first pre-boot capacitor;
second main pump capacitor to receive the sixth phase signal from the plurality of phase generators and to the second pre-boot capacitor;
forming a blocking circuit to prevent charge from the first and second main pump capacitors from leaking back to the first and second pre-boot capacitors;

coupling the blocking circuit to at least one of the plurality of phase generators; and coupling first and second gating devices to the first and second main pump capacitors, respectively.

36. A method for making a charge pump, comprising:

forming first and second pre-boot capacitors driven by a first phase signal, a second phase signal, a third phase signal and a fourth phase signal, wherein the first phase signal and the second phase signal are non-overlapping and crossing around high points during every phase cycle and the third phase signal and the fourth phase signal are non-overlapping an crossing around low points during every phase cycle;

forming first and second main pump capacitors and coupling to a fifth phase signal and a sixth phase signal wherein the fifth phase signal and the sixth phase signal are non-overlapping and crossing around high points during every phase cycle;

coupling the first and second main pump capacitors to the first and second pre-boot capacitors; and forming a blocking circuit to prevent charge from the first and second main pump capacitors from leaking back to the first and second pre-boot capacitors in response to the third and fourth phase signals, wherein forming the blocking circuit includes:
forming a priming capacitor, and
forming a pass transistor controlled by the priming capacitor.

37. A method for making a charge pump, comprising:

forming a charge storage device;

forming a generator circuit including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

forming a pre-charge circuit for charging the charge storage device to a charge level to provide a predetermined output voltage from the charge pump; and forming a blocking circuit to prevent charge leakage from the charge storage device to the pre-charge circuit in response to the third and fourth phase signals, wherein forming the blocking circuit includes:
forming a priming capacitor, and
forming a pass transistor controlled by the priming capacitor.

38. A method for making a charge pump, comprising:

forming a plurality of phase generators including a first primary phase generator producing a first phase signal and a third phase signal and a second primary phase generator producing a second phase signal and a fourth phase signal wherein the first phase signal and second phase signal are non-overlapping and crossing around high points during every phase cycle and the third phase signal and the fourth phase signal are non-overlapping and crossing around low points during every phase cycle;

forming a first main pump;
forming second main pump;
forming a plurality of pre-charge circuits coupled to the first and second main pumps;
forming a blocking circuit to prevent charge from leaking from the first and second main pumps to the plurality of pre-charge circuits;
coupling the blocking circuit to at least one of the plurality of phase generators
wherein the first main pump capacitor and the second main pump capacitor coupled to be pre-boosted to a first predetermined level by the pre-charge capacitor circuit during the first and second phase cycles, respectively, wherein the first predetermined level is moved to a second predetermined level in response to the plurality of phase generators during a first and a second phase cycles, respectively, wherein the second predetermined level is moved to a third predetermined level in response to the plurality of phase generators during the firs and second phase cycles, respectively, and wherein the third predetermined level is transferred to the first and a second gating devices, during the first and second phase cycles, respectively.

39. The method of claim 38, wherein forming a blocking circuit comprises forming a pass transistor coupled between the first and second main pumps and the plurality of pre-charge circuits.

40. The method of claim 38, wherein forming the blocking circuit comprises:
forming a priming circuit; and
forming a pass transistor coupled to the priming circuit wherein the pass transistor is shut off by the priming circuit when the main pumps are switched to prevent charge from leaking from the main pumps to the plurality of pre-charge circuits.

41. A method of making an electronic system, comprising:
forming a processor;
forming a charge pump, wherein forming a charge pump comprises:
forming a plurality of phase generators including a first primary phase generator for producing a first phase signal and a third phase signal, a first secondary phase generator for producing a fifth phase signal, a second primary phase generator for producing a second phase signal and a fourth phase signal, and a second secondary phase generator for producing a sixth phase signal wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;
coupling first pre-boot capacitor to the plurality of phase generators to receive the first phase signal and the third phase signal and second pre-boot capacitor coupled to the plurality of phase generators to receive the second phase signal and the fourth phase signal;
coupling first main pump capacitor coupled to receive the fifth phase signal from the plurality of phase generators and coupling to the first pre-boot capacitor;
coupling second main pump capacitor to receive the sixth phase signal from the plurality of phase generators and coupling to the second pre-boot capacitor;

forming a blocking circuit to prevent charge from the first and second main pump capacitors from leaking back to the first and second pre-boot capacitors wherein the blocking circuit is coupled to at least one of the plurality of phase generators to control operation of the blocking circuit in response to the third and fourth phase signals;

coupling the blocking circuit to at least one of the plurality of phase generators; and coupling first and second gating devices to the first and second main pump capacitors, respectively.

42. A method of making an electronic system, comprising:

forming a processor;

forming a charge pump, wherein forming a charge pump comprises:

forming a plurality of phase generators including a first primary phase generator producing a first phase signal and a third phase signal and a second primary phase generator producing a second phase signal and a fourth phase signal wherein the first phase signal and second phase signal are non-overlapping and crossing around high points during every phase cycle and the third phase signal and the fourth phase signal are non-overlapping crossing around low points during every phase cycle;

forming a first main pump capacitor;

forming a second main pump capacitor;

forming a plurality of pre-charge circuits coupled to the first and second main pump capacitors and to the plurality of phase generators to pre-charge each of the first and second main pump capacitors to a predetermined charge level, wherein an output voltage larger than an input voltage by a predetermined amount is outputted by the first and second main pump capacitors in response to reaching the predetermined charge level; and forming a blocking circuit to prevent charge from leaking from the first and second main pump capacitors to the plurality of pre-charge circuits, wherein forming the blocking circuit includes:

forming a priming capacitor, and forming a pass transistor controlled by the priming capacitor.

43. A method of making an electronic system, comprising:

forming a processor;

forming a charge pump, wherein forming a charge pump comprises:

forming a charge storage device;

forming a phase generator including a fist primary phase generator for producing a first phase signal and a third phase signal, a first secondary phase generator for producing a fifth phase signal, a second primary phase generator for producing a second phase signal and a fourth phase signal, and a second secondary phase generator for producing a sixth phase signal, wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

forming a pre-charge circuit for charging the charge storage device to a charge level to provide a predetermined output voltage from the charge pump;

forming a blocking circuit to prevent charge leakage from the charge storage device to the pre-charge circuit in response to the third and fourth phase signals, wherein forming the blocking circuit includes:

forming a priming capacitor coupled to the pre-charge circuit, and forming a pass transistor coupled to the priming capacitor, wherein priming capacitor controls operation of the pass transistor to prevent charge from leaking from the charge storage device to the pre-charge circuit.

44. A method of making an integrated circuit, comprising:

forming a charge pump, wherein forming a charge pump comprises:

forming a plurality of phase generators including a first primary phase generator formed for producing a first phase signal and a third phase signals, a first secondary phase generator formed for producing a fifth phase signal, a second primary phase generator formed for producing a second phase signal and a fourth phase signal, and a second secondary phase generator formed for producing a sixth phase signal;

wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

coupling a first pre-boot capacitor to receive the first phase signal and the third phase signal from the plurality of phase generators and coupling a second pre-boot capacitor to receive the second phase signal and the fourth phase signal from the plurality of phase generators;

coupling a first main pump capacitor to receive the fifth phase signal from the plurality of phase generators and further coupling to the first pre-boot capacitor;

coupling a second main pump capacitor to receive the sixth phase signal from the plurality of phase generators and further coupling to the second pre-boot capacitor;

forming a blocking circuit to prevent charge from the first and second main pump capacitors from leaking back to the first and second pre-boot capacitors;

coupling the blocking circuit to at least one of the plurality of phase generators; and coupling first and second gating devices to the first and second main pump capacitors, respectively.

45. A method of making an integrated circuit, comprising:

forming a charge pump, wherein forming a charge pump comprises:

forming a charge storage device;

forming a phase generator circuit including a first primary phase generator producing a first phase signal and a third phase signal, a first secondary phase generator producing a fifth phase signal, a second primary phase generator producing a second phase signal and a fourth phase signal, and a second secondary phase generator producing a sixth phase signal wherein the fist phase signal and the second phase signal are non-overlapping an crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

forming a pre-charge circuit for charging the charge storage device to a charge level to provide a predetermined output voltage from the charge pump; and forming a blocking circuit to prevent charge leakage from the charge storage device to the pre-charge circuit, wherein forming the blocking circuit includes:

forming a priming capacitor coupled to the pre-charge circuit, and forming a pass transistor coupled to the priming capacitor, wherein the priming capacitor controls operation of the pass transistor to prevent charge from leaking from the charge storage device to the pre-charge circuit in response to the third and fourth phase signals.

46. A method of making an integrated circuit, comprising:

forming a two phase cycle charge pump, wherein forming a charge pump comprises:

forming a plurality of phase generators including first primary phase generator producing a first phase signal and a third phase signal, a first secondary phase generator producing a fifth phase signal, a second primary phase generator producing a second phase signal and a fourth phase signal, and a second secondary phase generator producing a sixth phase signal wherein the first phase signal and the second phase signal are non-overlapping and crossing around high points during every phase cycle, the third phase signal and the fourth phase signal are non-overlapping and crossing around low points during every phase cycle, and the fifth phase signal and the sixth phase signal are non-overlapping and crossing around high points during every phase cycle;

forming a first main pump forming a second main pump;

forming a plurality of pre-charge circuits including a first pre-boot capacitor and a second pre-boot capacitor coupled to each of the first and second main pumps;

forming a blocking circuit to prevent charge from leaking from the first and second main pumps to the plurality of pre-charge circuits, wherein forming the blocking circuit includes:

forming a priming capacitor, and forming a pass transistor controlled by the priming capacitor, wherein in the first phase of the two-phase cycle, the first main pump capacitor receives the fifth phase signal from the first secondary phase generator and outputs a charge to a first p-channel circuit while the second main pump capacitor is getting pre-booted to a predetermined boot level by the second pre-boot capacitor; and wherein in the second phase of the two phase cycle, the second main pump capacitor receives the sixth phase signal from the second secondary phase generator and outputs the charge to a second p-channel circuit while the first main pump capacitor is getting pre-boot to the predetermined boot level by the first pre-boot circuit.

* * * * *

UNITED STATES PATENT AND TRADEMARK OFFICE
CERTIFICATE OF CORRECTION

PATENT NO. : 6,833,752 B2
DATED : December 21, 2004
INVENTOR(S) : Merritt et al.

It is certified that error appears in the above-identified patent and that said Letters Patent is hereby corrected as shown below:

Column 7,
Line 21, delete "Als" and insert -- Also --, therefor.
Line 35, after "respectively" delete "," and insert -- . --, therefor.
Line 47, delete "an" and insert -- and --, therefor.

Column 14,
Line 24, delete "generator" and insert -- generators --, therefor.

Column 15,
Line 29, after "respectively" delete "," and insert -- ; --, therefor.
Line 59, after "response" delete "a" and insert -- to --, therefor.
Line 65, delete "base" and insert -- phase --, therefor.

Column 16,
Line 16, after "includes" delete ";" and insert -- : --, therefor.
Line 43, delete "phases" and insert -- phase --, therefor.

Column 17,
Line 57, after "and" insert -- a --.

Column 18,
Lines 37-38, delete "Wherein the first and second main pump capacitors are pre-booted to a first" (line repeated).

Column 19,
Line 32, delete "generate" and insert -- generator --, therefor.
Line 60, delete "base" and insert -- phase --, therefor.

Column 22,
Line 39, delete "reducing" and insert -- producing --, therefor.
Line 43, delete "an" and insert -- and --, therefor.

Column 25,
Line 49, delete "lust" and insert -- first --, therefor.

Column 26,
Lines 32 and 43, delete "front" and insert -- from --, therefor.
Line 45, delete "de" and insert -- the --, therefor.

UNITED STATES PATENT AND TRADEMARK OFFICE
CERTIFICATE OF CORRECTION

PATENT NO. : 6,833,752 B2
DATED : December 21, 2004
INVENTOR(S) : Merritt et al.

It is certified that error appears in the above-identified patent and that said Letters Patent is hereby corrected as shown below:

Column 28,
Line 8, after "circuit" insert -- during --.
Line 8, delete "cycle" and insert -- cycles --, therefor.
Line 42, after "to" insert -- a --.

Column 31,
Line 12, delete "an" and insert -- and --, therefor.

Column 32,
Line 11, after "capacitor" insert -- are --.
Line 16, after "during" delete "a" and insert -- the --, therefor.
Line 16, after "and" delete "a".
Line 20, delete "firs" and insert -- first --, therefor.

Column 33,
Line 50, delete "fist" and insert -- first --, therefor.
Line 67, after "pump" delete ":" and insert -- ; --, therefor.

Column 34,
Line 18, delete "signals" and insert -- signal --, therefor.

Signed and Sealed this

Seventeenth Day of May, 2005

JON W. DUDAS
*Director of the United States Patent and Trademark Office*